United States Patent
Horibe et al.

(10) Patent No.: US 10,548,081 B2
(45) Date of Patent: Jan. 28, 2020

(54) WIRELESS COMMUNICATION DEVICE AND WIRELESS COMMUNICATION METHOD USING A CARRIER SENSING TECHNIQUE

(71) Applicant: Murata Manufacturing Co., Ltd., Kyoto (JP)

(72) Inventors: Takayuki Horibe, Kyoto (JP); Nobumitsu Amachi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 195 days.

(21) Appl. No.: 15/352,751

(22) Filed: Nov. 16, 2016

(65) Prior Publication Data

US 2017/0070957 A1    Mar. 9, 2017

Related U.S. Application Data

(63) Continuation of application No. PCT/JP2015/055107, filed on Feb. 24, 2015.

(30) Foreign Application Priority Data

Jun. 9, 2014  (JP) .................................. 2014-118600

(51) Int. Cl.
*H04W 52/02* (2009.01)
*H04W 16/14* (2009.01)
(Continued)

(52) U.S. Cl.
CPC ....... *H04W 52/0222* (2013.01); *H04W 16/14* (2013.01); *H04W 52/0238* (2013.01); *H04W 4/38* (2018.02); *Y02D 70/00* (2018.01)

(58) Field of Classification Search
CPC ......... H04W 52/0222; H04W 52/0238; H04W 4/04; H04W 74/08; H04W 74/0808;
(Continued)

(56) References Cited

U.S. PATENT DOCUMENTS

2004/0038695 A1* 2/2004 Sharony ............. H04W 72/046
  455/517
2005/0053066 A1* 3/2005 Famolari ............. H04L 12/6418
  370/389
2010/0265922 A1* 10/2010 Bracha ............. H04W 74/0808
  370/336

FOREIGN PATENT DOCUMENTS

JP  H04-373343 A  12/1994
JP  H08-116323 A  7/1996
(Continued)

OTHER PUBLICATIONS

IEEE Standard 802.11 (Part 11: Wireless LAN Medium Access Control (MAC) and Physical Layer (PHY) Specifications), IEEE, Mar. 29, 2012, All Pages (Year: 2012).*

(Continued)

*Primary Examiner* — Robert C Scheibel
(74) *Attorney, Agent, or Firm* — Pearne & Gordon LLP

(57) ABSTRACT

A data sequence to be transmitted is constituted by a data body and preceding data. The amount of preceding data is smaller than that of data body. If it is determined as a result of executing carrier sensing that a frequency band of radio waves to be transmitted is not being used by another contending communication system, the preceding data is transmitted after the lapse of a predetermined time. If it is determined as a result of executing carrier sensing after completion of transmitting of the preceding data that the frequency band is not being used by another contending communication system, the data body is transmitted after the lapse of a predetermined time. If it is determined that the frequency band is being used, the contention for the frequency band is avoided.

17 Claims, 14 Drawing Sheets

(51) Int. Cl.
*H04W 74/08* (2009.01)
*H04W 4/38* (2018.01)

(58) Field of Classification Search
CPC ............. H04W 84/12; H04W 74/0816; H04W 74/0825; Y02D 70/142; Y02D 70/00; Y02D 70/144
See application file for complete search history.

(56) References Cited

FOREIGN PATENT DOCUMENTS

| | | |
|---|---|---|
| JP | 2009-200806 A | 9/2009 |
| JP | 2012-089992 A | 10/2012 |

OTHER PUBLICATIONS

IEEE Standard for Information technology—Telecommunications and information exchange between systems Local and metropolitan area networks—Specific requirements Part 11: Wireless LAN Medium Access Control (MAC) and Physical Layer (PHY) Specifications, IEEE Std. 802.11th-2012 dated Mar. 29, 2012.
IEEE Standard for Local and metropolitan area networks—Part 15.4: Low-Rate Wireless Personal Area Networks (LR-WPANs) IEEE Std. 802.15.4th-2011 dated Sep. 5, 2011.
International search report for PCT/JP2015/055107 dated May 19, 2015.
Written Opinion for PCT/JP2015/055107 dated May 19, 2015.

\* cited by examiner

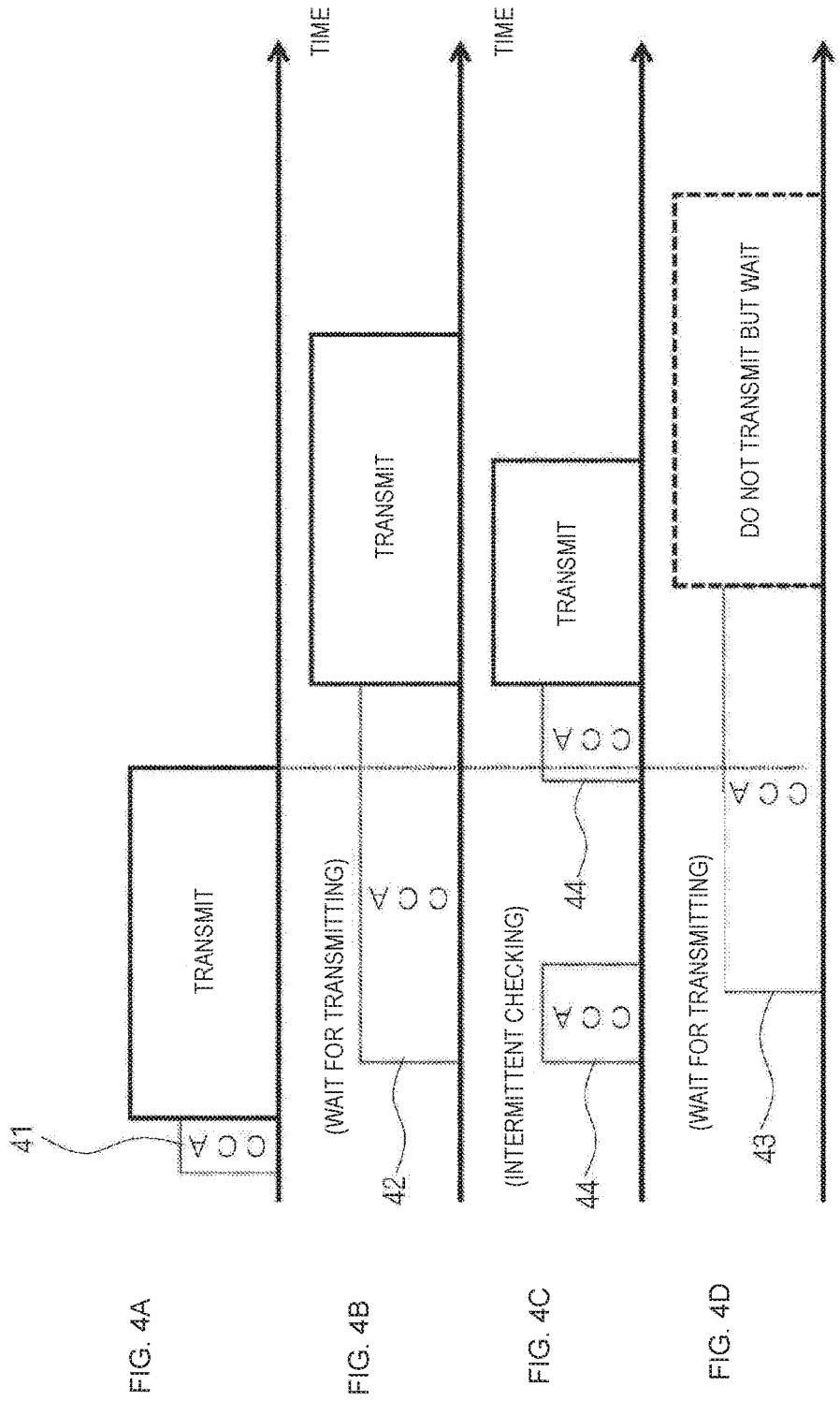

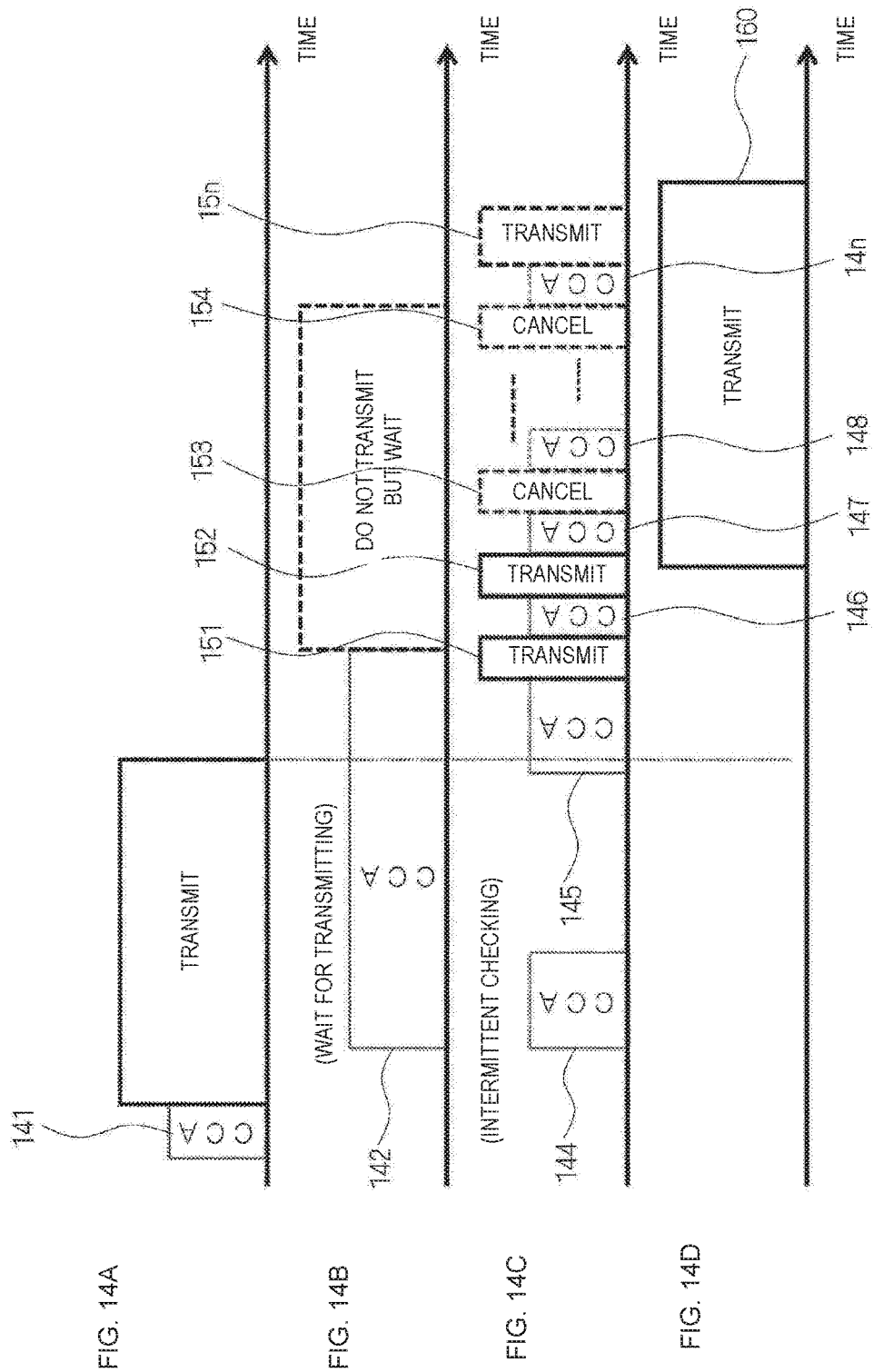

WIRELESS COMMUNICATION DEVICE AND WIRELESS COMMUNICATION METHOD USING A CARRIER SENSING TECHNIQUE

This is a continuation of International Application No. PCT/JP2015/055107 filed on Feb. 24, 2015 which claims priority from Japanese Patent Application No. 2014-118600 filed on Jun. 9, 2014. The contents of these applications are incorporated herein by reference in their entireties.

BACKGROUND

Technical Field

The present disclosure relates to a wireless communication device, a wireless communication method, and a computer program that make it possible to suppress an increase in the power consumption caused by collisions of communication packets and by the accompanying repeated retransmission so as to lengthen the battery life.

Non Patent Document 1, which is an international standard of wireless LAN systems, in particular, DCF (Distributed Coordination Function) access procedure in Section 9.3.4, describes the coordination function for a communication channel performed by individual terminals. This section also describes CSMA/CA (Carrier Sense Multiple Access with Collision Avoidance), which is a coordination technique using carrier sensing.

Non Patent Document 2, which is an international standard commonly used in WSN (Wireless Sensor Networks), describes the use of CSMA/CA. A wireless sensor network receives only a small amount of information from sensors and is usually battery-driven. It is thus highly desirable to reduce power consumption to a minimal amount, which makes it necessary for the wireless sensor network to perform low-rate, less-frequent data communication.

Patent Document 1 discloses a transmit-frequency limiter that automatically selects the frequency by executing carrier sensing. This transmit-frequency limiter is used as an attachment to another device so that this device will not use the wireless channel used by devices that are unable to change this channel and by devices to be specially protected.

CITATION LIST

Patent Document

Patent Document 1: Japanese Unexamined Patent Application Publication No. 2009-200806

Non Patent Document

Non Patent Document 1: IEEE Std 802.11-2012
Non Patent Document 2: IEEE Std 802.15.4-2011

BRIEF SUMMARY

Nowadays, wireless LAN systems are being widely used even in households, and the interference of another wireless LAN system using the same frequency band is also increasing accordingly. When a wireless communication device performs data communication by executing carrier sensing with the above-described communication protocol, power consumed in this device is increased due to the frequent retransmission of packets caused by packet collisions, thereby making it difficult to lengthen the battery life.

In an environment where plural data communication systems use the same frequency band, if wireless LAN systems and wireless sensor networks use CSMA/CA, a wireless communication device first executes CCA (Clear Channel Assessment) to check intermittently at regular intervals whether this frequency band is being used by another system. Then, upon detecting that the frequency band is free, the wireless communication device starts data communication by using this frequency band after the lapse of a certain wait time.

As more wireless communication devices are in the state in which they wait for starting data communication, more wireless communication devices may finish waiting at the same time or the approximately same time. It is thus highly likely that plural wireless communication devices will start data communication at the same time. In order to avoid such a situation, in accordance with an increased number of waiting sessions, a pseudo wait time is randomly added to a certain wait time so that the end of the wait time of a wireless communication device will not coincide with that of another wireless communication device, that is, collisions of communication packets will be avoided. In this case, however, even if collisions of communication packets are avoided, a wireless communication device is required to perform CCA more frequently in accordance with the increased number of waiting sessions, which may make it even more difficult to reduce power consumption.

The present disclosure has been made in view of the above-described background. The present disclosure provides a wireless communication device, a wireless communication method, and a computer program that makes it possible to suppress an increase in the power consumption caused by collisions of communication packets and by the accompanying repeated retransmission so as to lengthen the battery life.

According to the present disclosure, there is provided a wireless communication device that controls a contention state of a plurality of communication systems by using a carrier sensing technique. A data sequence to be transmitted is constituted by a data body and preceding data. An amount of the preceding data is smaller than an amount of the data body. The wireless communication device includes: first collision determining means for determining, by executing carrier sensing, whether a frequency band of radio waves to be transmitted is being used by another contending communication system; preceding data transmitting means for transmitting the preceding data after a lapse of a predetermined time if the first collision determining means determines that the frequency band is not being used; second collision determining means for determining, by executing carrier sensing after completion of transmitting of the preceding data, whether the frequency band is being used by another contending communication system; data body transmitting means for transmitting the data body after a lapse of a predetermined time if the second collision determining means determines that the frequency band is not being used; and contention avoiding means for avoiding a contention for the frequency band if the first collision determining means and/or the second collision determining means determines that the frequency band is being used.

In the above-described configuration, it is determined by executing carrier sensing whether the frequency band of radio waves to be transmitted is being used by another contending communication system. If it is determined that the frequency band is not being used, the preceding data is transmitted after the lapse of a predetermined time. It is then determined by executing carrier sensing after completion of transmitting of the preceding data whether the frequency band is being used by another contending communication system. If it is determined that the frequency band is not being used, the data body is transmitted after the lapse of a predetermined time. If it is determined that the frequency band is being used, the contention for the frequency band is avoided. With this configuration, after carrier sensing is executed to check that there is no contention for the frequency band, the preceding data having a smaller data amount than the data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to reduce the communication load. Even with the occurrence of the contention for the frequency band, only a small amount of data results in a waste in data transmission because the subsequent data transmission is canceled, thereby making it possible to reduce the power consumption of a wireless communication apparatus, such as a wireless communication device.

The wireless communication device according to the present disclosure may further include transmit data dividing means for dividing the data sequence into the preceding data and the data body.

In the above-described configuration, the data sequence is divided into the preceding data and the data body. With this configuration, by the use of the preceding data, carrier sensing is first executed to check that there is no contention for the frequency band, and then, the data body is transmitted. This eliminates the need to transmit the whole data sequence when the contention for the frequency band is occurring, thereby making it possible to reduce the communication load.

In the wireless communication device according to the present disclosure, the transmit data dividing means may divide the data sequence to be transmitted into two or more partial data sequences.

In the above-described configuration, the data sequence to be transmitted is divided into two or more partial data sequences, which allows more precise checking for the occurrence of the contention for the frequency band. It is thus possible to eliminate the need to transmit the whole data sequence when the contention for the frequency band is occurring and thus to reduce the communication load.

In the wireless communication device according to the present disclosure, the preceding data may be a portion of the data sequence, and the data body may be a remaining portion of the data sequence.

In the above-described configuration, the preceding data is a portion of the data sequence, and the data body is a remaining portion of the data sequence. It is thus possible to eliminate the need to transmit data which may result in a waste and thus to reduce the communication load as a whole.

In the wireless communication device according to the present disclosure, the data sequence may be constituted by header information and a body, and the preceding data may be the header information of the data sequence to be transmitted.

In the above-described configuration, the preceding data is the header information of the data sequence to be transmitted. The header information is easy to separate from the data sequence and to retransmit and also includes information concerning the data content and the modulation method. This makes it easy to identify the wireless communication scheme and to obtain information useful for avoiding the contention state for the frequency band.

In the wireless communication device according to the present disclosure, dummy data, which is independent of the data sequence to be transmitted, may be provided and may be used as the preceding data.

In the above-described configuration, dummy data, which is independent of the data sequence to be transmitted, is provided and is used as the preceding data. With this configuration, by the use of the dummy data, carrier sensing is first executed to check that there is no contention for the frequency band, and then, the data body is transmitted. This eliminates the need to transmit the whole data sequence when the contention for the frequency band is occurring, thereby making it possible to reduce the communication load.

In the wireless communication device according to the present disclosure, the preceding data may include identification information for identifying a transmission source and/or a transmission destination.

In the above-described configuration, the preceding data includes identification information for identifying a transmission source and/or a transmission destination. With the identification information, the transmission source and/or the transmission destination can easily be identified. This makes it possible to prevent a destination device from omitting to receive any item of data and also to easily integrate plural items of data into one item of data.

In the wireless communication device according to the present disclosure, the contending communication system may be a wireless LAN system.

In the above-described configuration, the contending communication system, which is a wireless LAN system, should include a CSMA/CA function and is likely to use the frequency band considerably frequently. Consequently, after it is checked that there is no contention for the frequency band used in a wireless LAN system, the data body is transmitted. This eliminates the need to transmit the whole data sequence when the contention for the frequency band is occurring, thereby making it possible to reduce the communication load.

In the wireless communication device according to the present disclosure, a minimum wait time used for making a determination by the first and second collision determining means regarding whether the frequency band of radio waves to be transmitted is being used by the contending communication system may be shorter than a minimum wait time defined by a protocol of the wireless LAN system.

In the above-described configuration, the minimum wait time used for determining whether the frequency band of radio waves to be transmitted is being used by the contending communication system is shorter than that defined by a protocol of the wireless LAN system. Consequently, if it is determined that the frequency band of radio waves for transmitting the preceding data is not being used, a collision with the wireless LAN system is not likely to occur.

In the wireless communication device according to the present disclosure, the data sequence may be a data sequence received from a sensor at regular time intervals.

In the above-described configuration, the data sequence is a data sequence received from a sensor at regular time intervals. In a sensor network system, after carrier sensing is executed to check that there is no contention for the frequency band, preceding data having a smaller data amount than a data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to lengthen the battery life of the sensor.

According to the present disclosure, there is provided a wireless communication method to be performed by a wireless communication device that controls a contention state of a plurality of communication systems by using a carrier sensing technique. A data sequence to be transmitted is constituted by a data body and preceding data. An amount of the preceding data is smaller than an amount of the data body. The wireless communication method includes: a first step of determining, by the wireless communication device, by executing carrier sensing whether a frequency band of radio waves to be transmitted is being used by another contending communication system; a second step of transmitting, by the wireless communication device, the preceding data after a lapse of a predetermined time if the first step determines that the frequency band is not being used; a third step of determining, by the wireless communication device, by executing carrier sensing after completion of transmitting of the preceding data, whether the frequency band is being used by another contending communication system; a fourth step of transmitting, by the wireless communication device, the data body after a lapse of a predetermined time if the third step determines that the frequency band is not being used; and a fifth step of avoiding, by the wireless communication device, a contention for the frequency band if the first step and/or the third step determines that the frequency band is being used.

In the above-described configuration, it is determined by executing carrier sensing whether the frequency band of radio waves to be transmitted is being used by another contending communication system. If it is determined that the frequency band is not being used, the preceding data is transmitted after the lapse of a predetermined time. It is then determined by executing carrier sensing after completion of transmitting of the preceding data whether the frequency band is being used by another contending communication system. If it is determined that the frequency band is not being used, the data body is transmitted after the lapse of a predetermined time. If it is determined that the frequency band is being used, the contention for the frequency band is avoided. With this configuration, after carrier sensing is executed to check that there is no contention for the frequency band, the preceding data having a smaller data amount than the data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to reduce the communication load. Even with the occurrence of the contention for the frequency band, only a small amount of data results in a waste in data transmission because the subsequent data transmission is canceled, thereby making it possible to reduce the power consumption of a wireless communication apparatus, such as a wireless communication device.

The wireless communication method according to the present disclosure may include a sixth step of dividing, by the wireless communication device, the data sequence into the preceding data and the data body.

In the above-described configuration, the data sequence is divided into the preceding data and the data body. With this configuration, by the use of the preceding data, carrier sensing is first executed to check that there is no contention for the frequency band, and then, the data body is transmitted. This eliminates the need to transmit the whole data sequence when the contention for the frequency band is occurring, thereby making it possible to reduce the communication load.

In the wireless communication method according to the present disclosure, the sixth step may divide the data sequence to be transmitted into two or more partial data sequences.

In the above-described configuration, the data sequence to be transmitted is divided into two or more partial data sequences, which allows more precise checking for the occurrence of the contention for the frequency band. It is thus possible to eliminate the need to transmit the whole data sequence when the contention for the frequency band is occurring and thus to reduce the communication load.

In the wireless communication method according to the present disclosure, the preceding data may be a portion of the data sequence, and the data body may be a remaining portion of the data sequence.

In the above-described configuration, the preceding data is a portion of the data sequence, and the data body is a remaining portion of the data sequence. It is thus possible to eliminate the need to transmit data which may result in a waste and thus to reduce the communication load as a whole.

In the wireless communication method according to the present disclosure, the data sequence may be constituted by header information and a body. The preceding data may be the header information of the data sequence to be transmitted.

In the above-described configuration, the preceding data is the header information of the data sequence to be transmitted. The header information is easy to separate from the data sequence and to retransmit and also includes information concerning the data content and the modulation method. This makes it easy to identify the wireless communication scheme and to obtain information useful for avoiding the contention state for the frequency band.

In the wireless communication method according to the present disclosure, dummy data, which is independent of the data sequence to be transmitted, may be provided and may be used as the preceding data.

In the above-described configuration, dummy data, which is independent of the data sequence to be transmitted, is provided and is used as the preceding data. With this configuration, by the use of the dummy data, carrier sensing is first executed to check that there is no contention for the frequency band, and then, the data body is transmitted. This eliminates the need to transmit the whole data sequence when the contention for the frequency band is occurring, thereby making it possible to reduce the communication load.

In the wireless communication method according to the present disclosure, the preceding data may include identification information for identifying a transmission source and/or a transmission destination.

In the above-described configuration, the preceding data includes identification information for identifying a transmission source and/or a transmission destination. With the identification information, the transmission source and/or the transmission destination can easily be identified. This makes it possible to prevent a destination device from omitting to receive any item of data and also to easily integrate plural items of data into one item of data.

In the wireless communication method according to the present disclosure, the contending communication system may be a wireless LAN system.

In the above-described configuration, the contending communication system, which is a wireless LAN system, should include a CSMA/CA function and is likely to use the frequency band considerably frequently. Consequently, after it is checked that there is no contention for the frequency band used in a wireless LAN system, the data body is transmitted. This eliminates the need to transmit the whole data sequence when the contention for the frequency band is occurring, thereby making it possible to reduce the communication load.

In the wireless communication method according to the present disclosure, a minimum wait time used for making a determination by the first and third steps regarding whether the frequency band of radio waves to be transmitted is being used by the contending communication system may be shorter than a minimum wait time defined by a protocol of the wireless LAN system.

In the above-described configuration, the minimum wait time used for determining whether the frequency band of radio waves to be transmitted is being used by the contending communication system is shorter than that defined by a protocol of the wireless LAN system. Consequently, if it is determined that the frequency band of radio waves for transmitting the preceding data is not being used, a collision with the wireless LAN system is not likely to occur.

In the wireless communication method according to the present disclosure, the data sequence may be a data sequence received from a sensor at regular time intervals.

In the above-described configuration, the data sequence is a data sequence received from a sensor at regular time intervals. In a sensor network system, after carrier sensing is executed to check that there is no contention for the frequency band, preceding data having a smaller data amount than a data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to lengthen the battery life of the sensor.

According to the present disclosure, there is provided a computer program to be executed by a wireless communication device that controls a contention state of a plurality of communication systems by using a carrier sensing technique. A data sequence to be transmitted is constituted by a data body and preceding data. An amount of the preceding data is smaller than an amount of the data body. The computer program causes the wireless communication device to serve as: first collision determining means for determining, by executing carrier sensing, whether a frequency band of radio waves to be transmitted is being used by another contending communication system; preceding data transmitting means for transmitting the preceding data after a lapse of a predetermined time if the first collision determining means determines that the frequency band is not being used; second collision determining means for determining, by executing carrier sensing after completion of transmitting of the preceding data, whether the frequency band is being used by another contending communication system; data body transmitting means for transmitting the data body after a lapse of a predetermined time if the second collision determining means determines that the frequency band is not being used; and contention avoiding means for avoiding a contention for the frequency band if the first collision determining means and/or the second collision determining means determines that the frequency band is being used.

In the above-described configuration, it is determined by executing carrier sensing whether the frequency band of radio waves to be transmitted is being used by another contending communication system. If it is determined that the frequency band is not being used, the preceding data is transmitted after the lapse of a predetermined time. It is then determined by executing carrier sensing after completion of transmitting of the preceding data whether the frequency band is being used by another contending communication system. If it is determined that the frequency band is not being used, the data body is transmitted after the lapse of a predetermined time. If it is determined that the frequency band is being used, the contention for the frequency band is avoided. With this configuration, after carrier sensing is executed to check that there is no contention for the frequency band, the preceding data having a smaller data amount than the data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to reduce the communication load. Even with the occurrence of the contention for the frequency band, only a small amount of data results in a waste in data transmission because the subsequent data transmission is canceled, thereby making it possible to reduce the power consumption of a wireless communication apparatus, such as a wireless communication device.

The computer program according to the present disclosure may cause the wireless communication device to further serve as transmit data dividing means for dividing the data sequence into the preceding data and the data body.

In the above-described configuration, the data sequence is divided into the preceding data and the data body. With this configuration, by the use of the preceding data, carrier sensing is first executed to check that there is no contention for the frequency band, and then, the data body is transmitted. This eliminates the need to transmit the whole data sequence when the contention for the frequency band is occurring, thereby making it possible to reduce the communication load.

In the computer program according to the present disclosure, the transmit data dividing means may serve as means for dividing the data sequence to be transmitted into two or more partial data sequences.

In the above-described configuration, the data sequence to be transmitted is divided into two or more partial data sequences, which allows more precise checking for the occurrence of the contention for the frequency band. It is thus possible to eliminate the need to transmit the whole data sequence when the contention for the frequency band is occurring and thus to reduce the communication load.

In the computer program according to the present disclosure, the preceding data may be a portion of the data sequence, and the data body may be a remaining portion of the data sequence.

In the above-described configuration, the preceding data is a portion of the data sequence, and the data body is a remaining portion of the data sequence. It is thus possible to eliminate the need to transmit data which may result in a waste and thus to reduce the communication load as a whole.

In the computer program according to the present disclosure, the data sequence may be constituted by header information and a body, and the preceding data may be the header information of the data sequence to be transmitted.

In the above-described configuration, the preceding data is the header information of the data sequence to be transmitted. The header information is easy to separate from the data sequence and to retransmit and also includes information concerning the data content and the modulation method. This makes it easy to identify the wireless communication scheme and to obtain information useful for avoiding the contention state for the frequency band.

In the computer program according to the present disclosure, dummy data, which is independent of the data sequence to be transmitted, may be provided and may be used as the preceding data.

In the above-described configuration, dummy data, which is independent of the data sequence to be transmitted, is provided and is used as the preceding data. With this configuration, by the use of the dummy data, carrier sensing is first executed to check that there is no contention for the frequency band, and then, the data body is transmitted. This eliminates the need to transmit the whole data sequence when the contention for the frequency band is occurring, thereby making it possible to reduce the communication load.

In the computer program according to the present disclosure, the preceding data may include identification information for identifying a transmission source and/or a transmission destination.

In the above-described configuration, the preceding data includes identification information for identifying a transmission source and/or a transmission destination. With the identification information, the transmission source and/or the transmission destination can easily be identified. This makes it possible to prevent a destination device from omitting to receive any item of data and also to easily integrate plural items of data into one item of data.

In the computer program according to the present disclosure, the contending communication system may be a wireless LAN system.

In the above-described configuration, the contending communication system, which is a wireless LAN system, should include a CSMA/CA function and is likely to use the frequency band considerably frequently. Consequently, after it is checked that there is no contention for the frequency band used in a wireless LAN system, the data body is transmitted. This eliminates the need to transmit the whole data sequence when the contention for the frequency band is occurring, thereby making it possible to reduce the communication load.

In the computer program according to the present disclosure, a minimum wait time used for making a determination by the first and second collision determining means regarding whether the frequency band of radio waves to be transmitted is being used by the contending communication system may be shorter than a minimum wait time defined by a protocol of the wireless LAN system.

In the above-described configuration, the minimum wait time used for determining whether the frequency band of radio waves to be transmitted is being used by the contending communication system is shorter than that defined by a protocol of the wireless LAN system. Consequently, if it is determined that the frequency band of radio waves for transmitting the preceding data is not being used, a collision with the wireless LAN system is not likely to occur.

In the computer program according to the present disclosure, the data sequence may be a data sequence received from a sensor at regular time intervals.

In the above-described configuration, the data sequence is a data sequence received from a sensor at regular time intervals. In a sensor network system, after carrier sensing is executed to check that there is no contention for the frequency band, preceding data having a smaller data amount than a data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to lengthen the battery life of the sensor.

In the above-described configuration, after carrier sensing is executed to check that there is no contention for the frequency band, the preceding data having a smaller data amount than the data body is transmitted. Thereafter, carrier sensing is executed to check that there is no contention for the frequency band, and then, the data body is transmitted. This eliminates the need to transmit the whole data sequence when the contention for the frequency band is occurring, thereby making it possible to reduce the communication load. Even with the occurrence of the contention for the frequency band, only a small amount of data results in a waste in data transmission because the subsequent data transmission is canceled, thereby making it possible to reduce the power consumption of a wireless communication apparatus, such as a wireless communication device.

BRIEF DESCRIPTION OF THE SEVERAL VIEWS OF THE DRAWINGS

FIGS. 4A-4D illustrate a case in which a collision of communication packets in the same frequency band occurs in a known wireless communication device.

FIGS. 14A-14D illustrate the transmission timing of communication packets in the same frequency band in the wireless communication device according to the third embodiment of the present disclosure.

DETAILED DESCRIPTION

Embodiments of the present disclosure will be described below in detail with reference to the drawings.

First Embodiment

Figure 1:
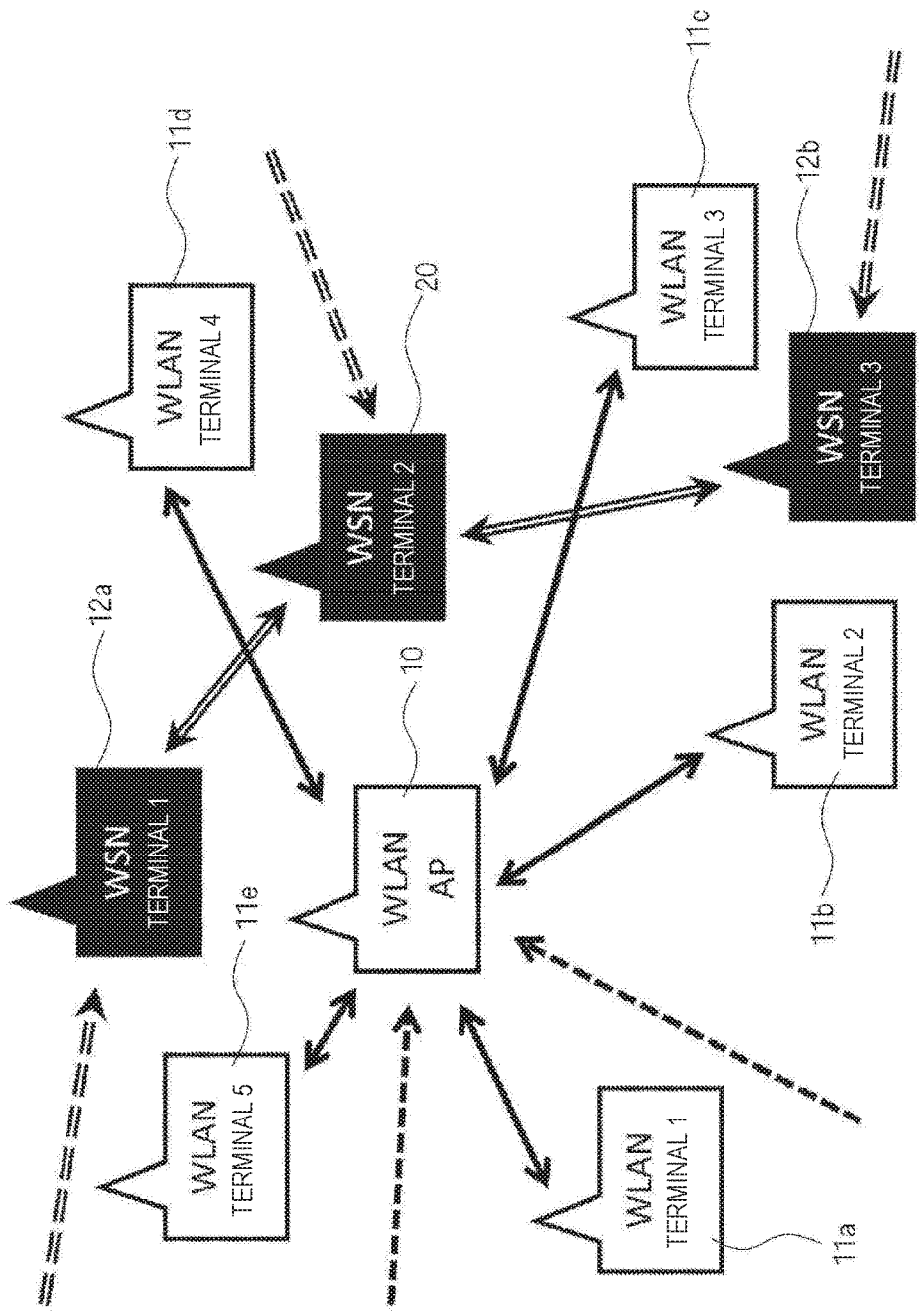
FIG. 1 is a schematic diagram of the configuration of a wireless communication system using a wireless communication device according to a first embodiment of the present disclosure.

FIG. 1 is a schematic diagram of the configuration of a wireless communication system using a wireless communication device according to a first embodiment of the present disclosure. As shown in FIG. 1, in the wireless communication system according to the first embodiment, plural wireless LAN terminals (WLAN terminals) 11a through 11e are connected to a wireless LAN server (WLAN AP) 10 and perform data communication by using a wireless LAN. Plural wireless system network terminals (WSN terminals) 12a, 12b, and 20 also perform wireless communication with each other in the wireless communication system.

Figure 2:
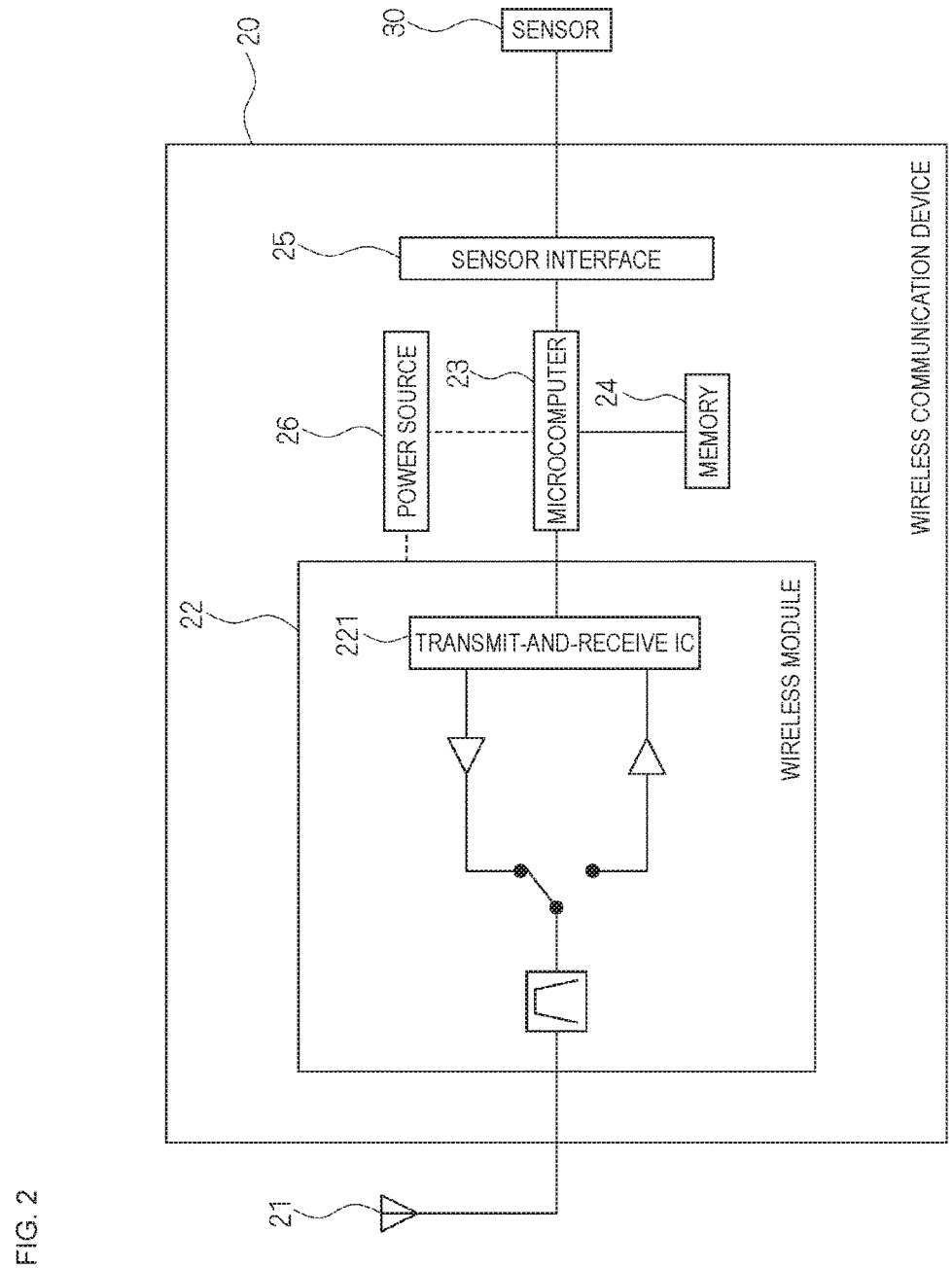
FIG. 2 is a block diagram of the configuration of the wireless communication device according to the first embodiment of the present disclosure.

The wireless communication device according to the first embodiment is placed as the wireless system network terminal 20 in the wireless communication system in which wireless communication is performed as described above. FIG. 2 is a block diagram of the configuration of the wireless communication device 20 according to the first embodiment of the present disclosure. In FIG. 2, the configuration of the wireless communication device 20 used as a wireless sensor device, for example, is illustrated.

As shown in FIG. 2, the wireless communication device 20 according to the first embodiment includes at least a wireless module 22 connected to an antenna 21, a microcomputer 23 that controls the operation, a memory 24 that temporarily stores data, a sensor interface 25 that receives signals from various sensors 30, and a power source (battery) 26 that supplies power. The types of sensors 30 are not restricted, and any sensors that are selected according to the purpose of use, such as an infrared sensor and an ultrasonic sensor, may be used.

The wireless module 22, which includes a transmit-and-receive IC 221, controls the transmitting and receiving of data performed via the antenna 21. The transmit-and-receive IC 221 and the microcomputer 23 receive power from the power source 26 and consume power by data communication or arithmetic processing.

Figure 3:
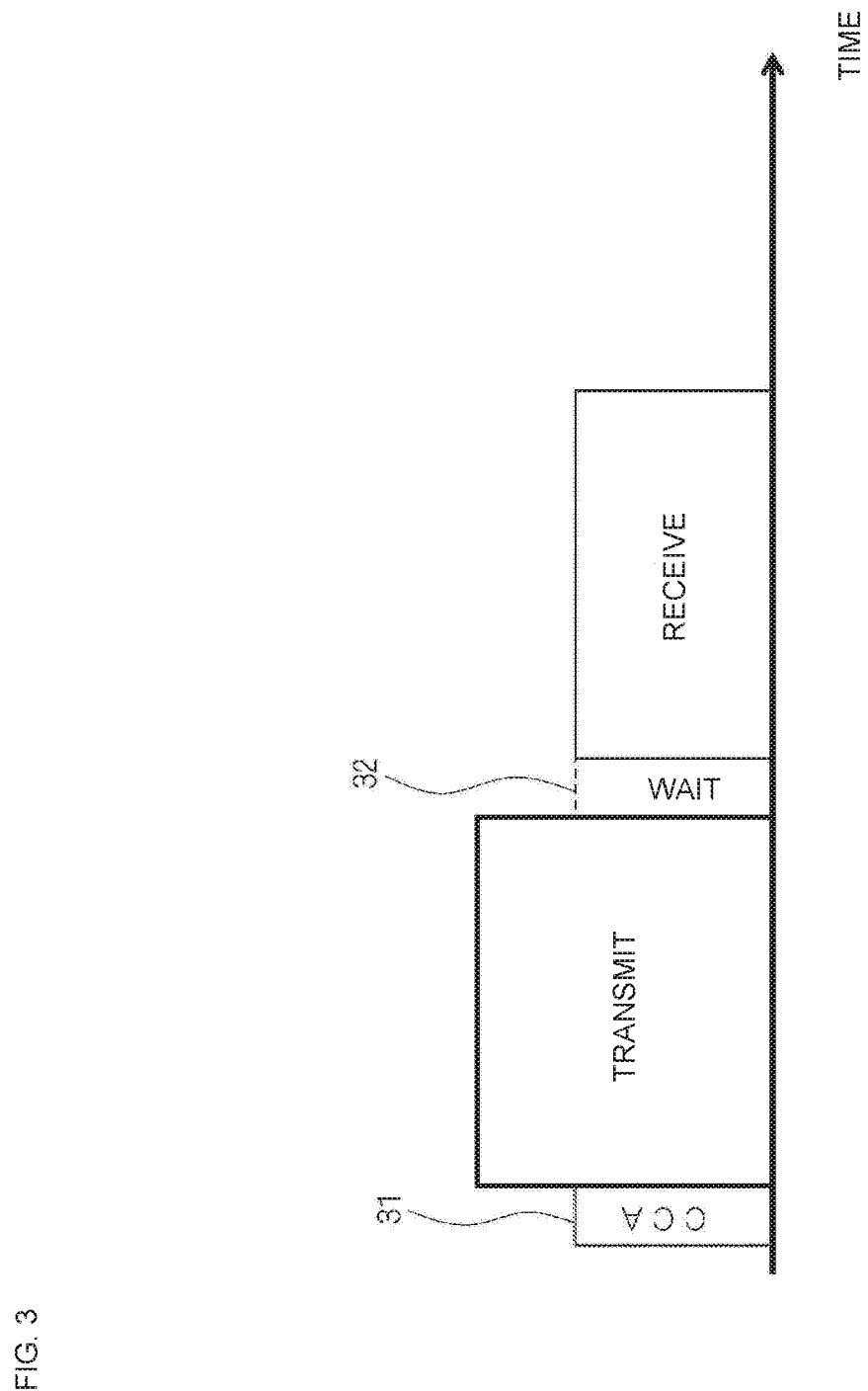
FIG. 3 is a time chart schematically illustrating a data transmit-and-receive operation performed by a known wireless communication device (such as a wireless LAN terminal).

FIG. 3 is a time chart schematically illustrating a data transmit-and-receive operation performed by a known wireless communication device (such as a wireless LAN terminal). As shown in FIG. 3, the wireless LAN terminals 11a through 11e (see FIG. 1), which usually use CSMA/CA, execute CCA (Clear Channel Assessment) to check intermittently at regular intervals whether the frequency band (channel) for transmitting data is being used by another wireless communication system. Hereinafter, executing of CCA may also be called executing of carrier sensing.

If it is detected that the frequency band for data transmission is not being used by another wireless communication system, that is, if it is detected that the frequency band is free, the known wireless LAN terminal performs data transmission by using this frequency band after the lapse of a certain wait time including the execution time of carrier sensing. In the example shown in FIG. 3, the known wireless LAN terminal executes CCA 31 before transmitting a data sequence, and performs data transmission upon detecting that the frequency band is free.

Upon completion of data transmission, if another wireless LAN terminal is executing carrier sensing, a predetermined wait time 32 is generated in addition to the execution time of carrier sensing. After the lapse of the wait time 32, if the frequency band is free, that is, if data communication is not being performed, the known wireless LAN terminal receives data transmitted from another wireless LAN terminal.

FIGS. 4A-4D illustrate a case in which a collision of communication packets in the same frequency band occurs in a known wireless communication device. FIG. 4A is a time chart illustrating an example of data transmission in the wireless LAN server 10 shown in FIG. 1. FIG. 4B and FIG. 4D are time charts illustrating examples of data transmission in the wireless LAN terminals 11b and 11c, respectively, shown in FIG. 1. FIG. 4C is a time chart illustrating an example of data transmission in the wireless system network terminal (hereinafter called the wireless communication device) 20 shown in FIG. 1.

In the example shown in FIGS. 4A-4D, the wireless LAN server 10 first performs data transmission after executing CCA 41. During this transmission time, even though the wireless LAN terminals 11b and 11c, for example, execute CCA 42 and CCA 43, respectively, to perform data transmission, they enter the data-transmission wait state since the frequency band is not free. The wireless communication device 20 executes CCA 44 intermittently at regular intervals to transmit data detected by the sensors.

As shown in FIGS. 4A-4D, the wireless LAN terminal 11c (FIG. 4D) fails to detect that the frequency band is free upon executing the CCA 43, and thus enters the wait state without necessarily performing data transmission. If the end of the wait time of the wireless LAN terminal 11b (FIG. 4B) and that of the wireless communication device 20 (FIG. 4C) coincide with each other when the wireless LAN server 10 (FIG. 4A) has finished data transmission, both of the wireless LAN terminal 11b (FIG. 4B) and the wireless communication device 20 (FIG. 4C) try to start data transmission at the same time and thus fail to transmit data.

After having failed to transmit data, both of the wireless LAN terminal 11b (FIG. 4B) and the wireless communication device 20 (FIG. 4C) execute carrier sensing again after the lapse of a certain period and then retransmit data. This means that power consumed for the previous data transmission is wasted. In particular, the wireless communication device 20 (FIG. 4C) includes the small power source 26 (see FIG. 2), such as a button cell, and thus desires to minimize a waste of power.

Figure 5A:
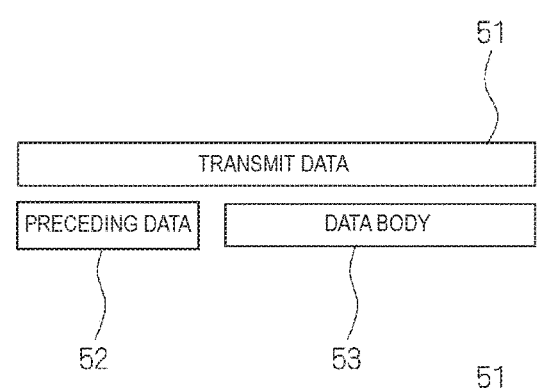
FIGS. 5A-5C illustrate examples of the configuration of data to be transmitted from the wireless communication device according to the first embodiment of the present disclosure.
Figure 5B:
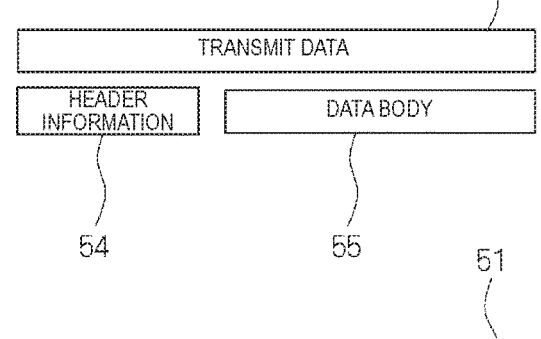
Figure 5C:

To satisfy this requirement, instead of transmitting the whole data, the wireless communication device (wireless system network terminal) 20 according to the first embodiment transmits only part of data after executing carrier sensing, and then transmits the remaining data after checking that the end of the wait time of the wireless communication device 20 will not coincide with that of another wireless communication device. FIGS. 5A-5C illustrate examples of the configuration of data to be transmitted from the wireless communication device 20 according to the first embodiment of the present disclosure.

As shown in FIG. 5A, the wireless communication device (wireless system network terminal) 20 according to the first embodiment divides transmit data 51 into preceding data 52 and a data body 53. The amount of preceding data 52 can be smaller than that of data body 53 in order to reduce the communication load even by a small amount.

Alternatively, as shown in FIG. 5B, the preceding data 52 may be header information 54. The header information 54 is easy to separate from the transmit data 51 and to retransmit and also includes information concerning the data content and the modulation method. This makes it easy to identify the wireless communication scheme and to obtain information useful for avoiding the contention state. The header information 54 has a smaller data amount than data body 55 and thus contributes to decreasing the communication load even by a small amount.

The header information 54, which is preceding data, includes identification information for identifying the transmission source and/or the transmission destination. Examples of the identification information are the IP address and the MAC address indicating the transmission source and/or the transmission destination and the transmission source ID and/or the transmission destination ID. With the identification information, the transmission source and/or the transmission destination can easily be identified. This makes it possible to prevent a destination device from omitting to receive any item of data and also to easily integrate plural items of data into one item of data. The preceding data 52 which is simply divided from the transmit data 51, as shown in FIG. 5A, also can include identification information for identifying the transmission source and/or the transmission destination.

Alternatively, as shown in FIG. 5C, dummy data 56 may be provided and be used as preceding data. With the use of the dummy data 56, carrier sensing is executed first, and then, after checking that there is no contention for the frequency band, the transmit data 51, which is a data body, can be transmitted. This eliminates the need to transmit the transmit data 51 when the contention for the frequency band is occurring, thereby making it possible to reduce the communication load.

Figure 6:
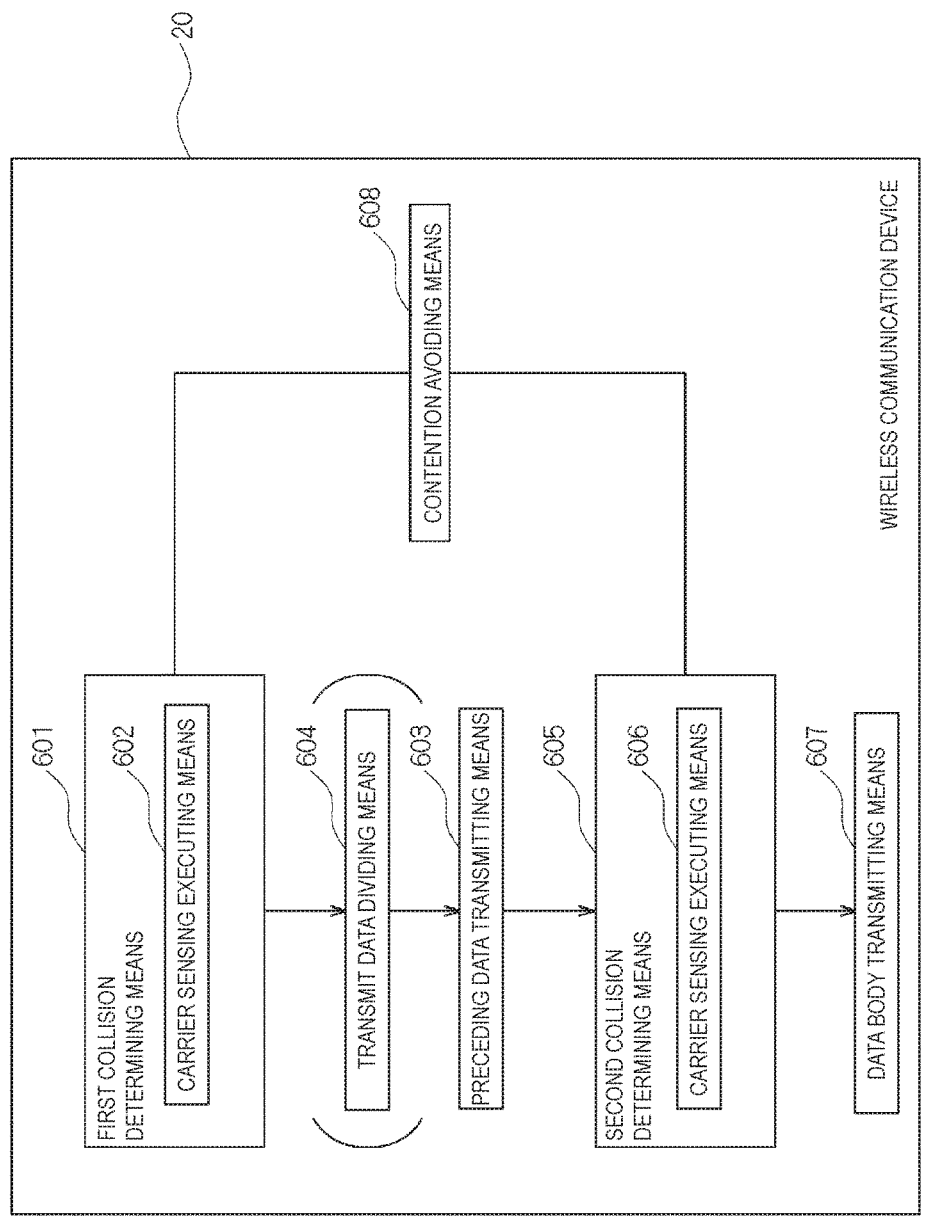
FIG. 6 is a functional block diagram of the wireless communication device according to the first embodiment of the present disclosure.

FIG. 6 is a functional block diagram of the wireless communication device 20 according to the first embodiment of the present disclosure. As shown in FIG. 6, first collision determining means 601 of the wireless communication device 20 according to the first embodiment executes carrier sensing to determine whether the frequency band of radio waves to be transmitted is being used by another contending communication system. More specifically, the first collision determining means 601, which includes carrier sensing executing means 602, determines before starting data transmission whether the frequency band (channel) of radio waves for wireless communication is being used. The state in which the frequency band is not used is called an "idle state", while the state in which the frequency band is used is called a "busy state".

If the first collision determining means 601 determines that the frequency band of radio waves to be transmitted is not being used by another contending communication system, that is, the frequency band is in the idle state, preceding data transmitting means 603 transmits preceding data after the lapse of a predetermined time. The preceding data is the preceding data 52 shown in FIGS. 5A-5C, and may be the header information 54 or the dummy data 56. The preceding data may be generated before carrier sensing is executed. Alternatively, transmit data dividing means 604 may be provided to divide a data sequence to be transmitted into preceding data and a data body.

After the preceding data has been transmitted, second collision determining means 605 executes carrier sensing to determine whether the frequency band of radio waves to be transmitted is being used by another contending communication system. More specifically, the second collision determining means 605, which includes carrier sensing executing means 606, determines before starting data transmission whether the frequency band (channel) of radio waves for wireless communication is being used.

If the second collision determining means 605 determines that the frequency band of radio waves to be transmitted is not being used, that is, the frequency band is in the idle state, data body transmitting means 607 transmits a data body after the lapse of a predetermined time. Then, the transmission of the whole data sequence has been completed.

Contention avoiding means 608 avoids the contention for the frequency band if the first collision determining means 601 and/or the second collision determining means 605 determines that the frequency band of radio waves to be transmitted is being used by another contending communication system, that is, the frequency band is in the busy state. If the first collision determining means 601 determines that the frequency band is in the busy state, the transmitting of the whole data is canceled so as to avoid the transmission of data which may result in a waste.

If the second collision determining means 605 determines that the frequency band is in the busy state, the transmitting of the data body is canceled. In this case, although the preceding data has been transmitted, it is still possible to reduce the communication load since the amount of preceding data is small.

Figure 7:
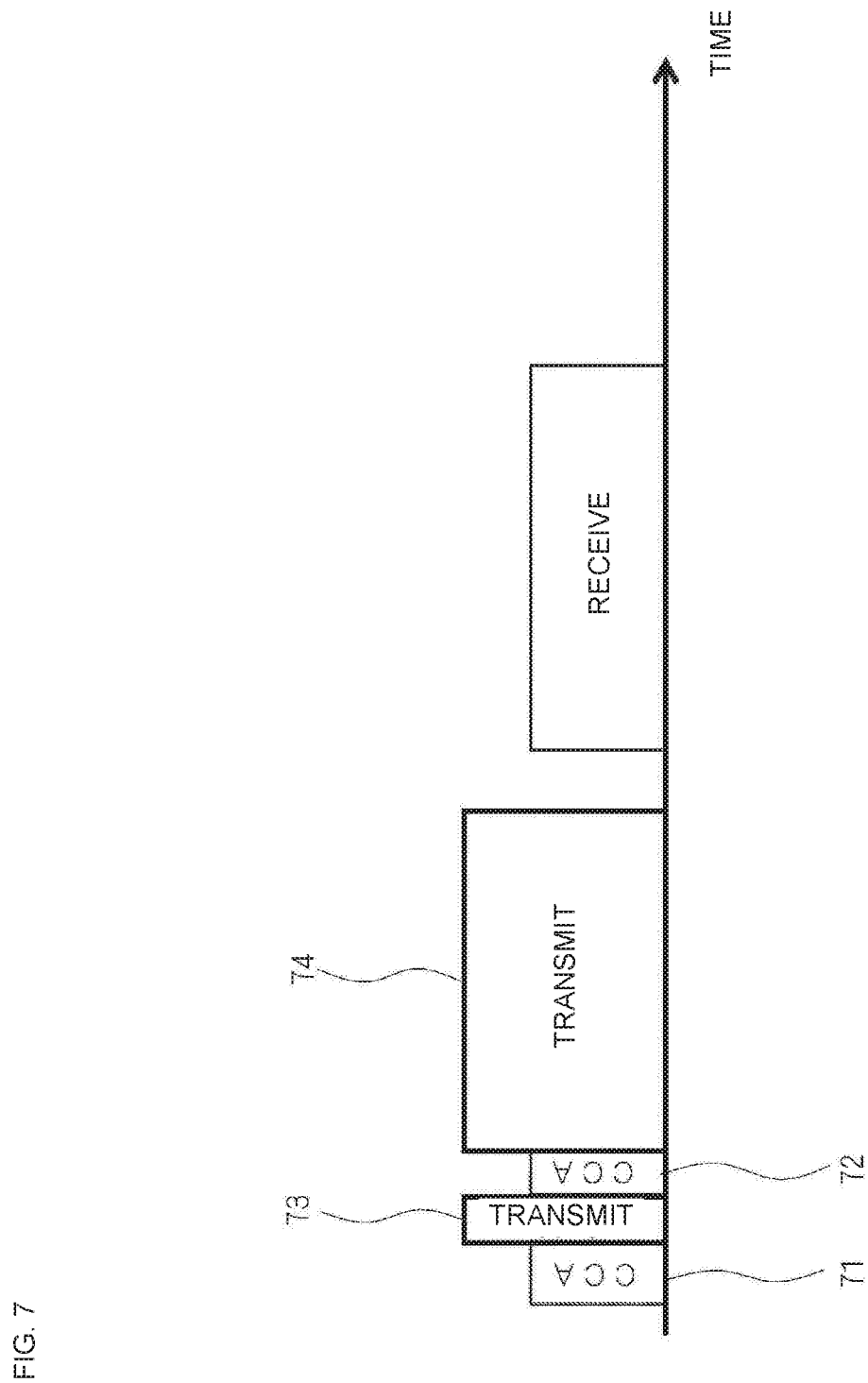
FIG. 7 is a time chart schematically illustrating a data transmit-and-receive operation performed by the wireless communication device according to the first embodiment of the present disclosure.

FIG. 7 is a time chart schematically illustrating a data transmit-and-receive operation performed by the wireless communication device 20 according to the first embodiment of the present disclosure. As shown in FIG. 7, the wireless communication device 20, which uses CSMA/CA, executes CCA (Clear Channel Assessment) (carrier sensing) to check intermittently at regular intervals whether the frequency band (channel) for data transmission is being used by another wireless communication system.

If it is detected that the frequency band for data transmission is not being used by another wireless communication system, that is, the frequency band is free, the wireless communication device 20 performs data transmission by using this frequency band after the lapse of a certain wait time including the execution time of carrier sensing.

In the example shown in FIG. 7, a data sequence is divided into preceding data 73 and a data body 74. The wireless communication device 20 first executes CCA 71 before transmitting the preceding data 73, and upon detecting that the frequency band is free, the wireless communication device 20 transmits the preceding data 73. When the preceding data 73 has been transmitted, the wireless communication device 20 executes CCA 72 again. Upon detecting again that the frequency band is free, the wireless communication device 20 transmits the remaining data body 74.

Upon completion of transmitting of the whole data sequence, if another wireless LAN terminal is executing carrier sensing, a predetermined wait time is generated in addition to the execution time of carrier sensing. After the lapse of the wait time, if the frequency band is free, that is, if data communication is not being performed, the wireless communication device 20 receives data transmitted from another wireless LAN terminal.

Figure 8:
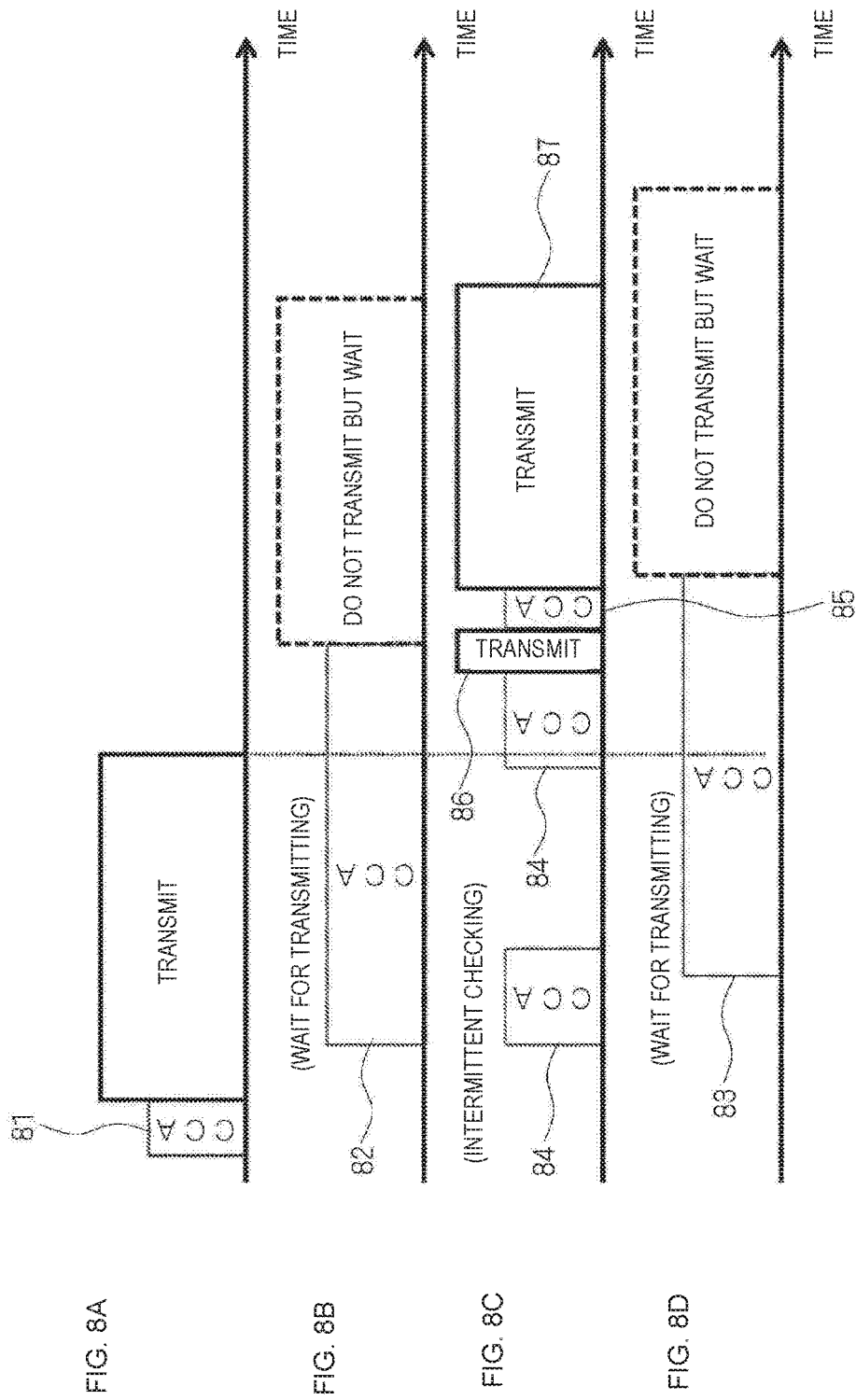
FIGS. 8A-8D illustrate a case in which a collision of communication packets in the same frequency band does not occur in the wireless communication device according to the first embodiment of the present disclosure.

FIGS. 8A-8D illustrate a case in which a collision of communication packets in the same frequency band does not occur in the wireless communication device 20 according to the first embodiment of the present disclosure. FIG. 8A is a time chart illustrating an example of data transmission in the wireless LAN server 10 shown in FIG. 1. FIG. 8B and FIG. 8D are time charts illustrating examples of data transmission in the wireless LAN terminals 11*b* and 11*c*, respectively, shown in FIG. 1. FIG. 8C is a time chart illustrating an example of data transmission in the wireless communication device (wireless system network terminal) 20 shown in FIG. 1.

In the example in FIGS. 8A-8D, the wireless LAN server 10 (FIG. 8A) first performs data transmission after executing CCA 81. During this transmission time, even though, for example, the wireless LAN terminal 11*b* (FIG. 8B), the wireless communication device 20 (FIG. 8C), and the wireless LAN terminal 11*c* (FIG. 8D) execute CCA 82, CCA 84, and CCA 83 respectively, to perform data transmission, they enter the data-transmission wait state since the frequency band is not free. The wireless communication device 20 executes the CCA 84 intermittently at regular intervals to transmit data detected by the sensors 30.

As shown in FIGS. 8A-8D, the wireless LAN terminal 11*c* (FIG. 8D) fails to detect that the frequency band is free upon executing the CCA 83, and thus enters the wait state without necessarily performing data transmission. When the wireless LAN server 10 (FIG. 8A) has finished data transmission, the wireless LAN terminal 11*b* (FIG. 8B) and the wireless communication device 20 (FIG. 8C) are still in the wait state. The end of the wait time of the wireless communication device 20 (FIG. 8C) is earlier than that of the wireless LAN terminal 11*b* (FIG. 8B) (the wait time of the wireless communication device 20 is shorter than that of the wireless LAN terminal 11*b*).

The wireless LAN terminal 11*b* (FIG. 8B) does not transmit data but waits, because the frequency band is occupied by preceding data 86 transmitted from the wireless communication device 20 (FIG. 8C). In contrast, the wireless communication device 20 (FIG. 8C) that has transmitted the preceding data 86 executes CCA 85 again to check that the frequency band is free, and then transmits a data body 87.

Figure 9:
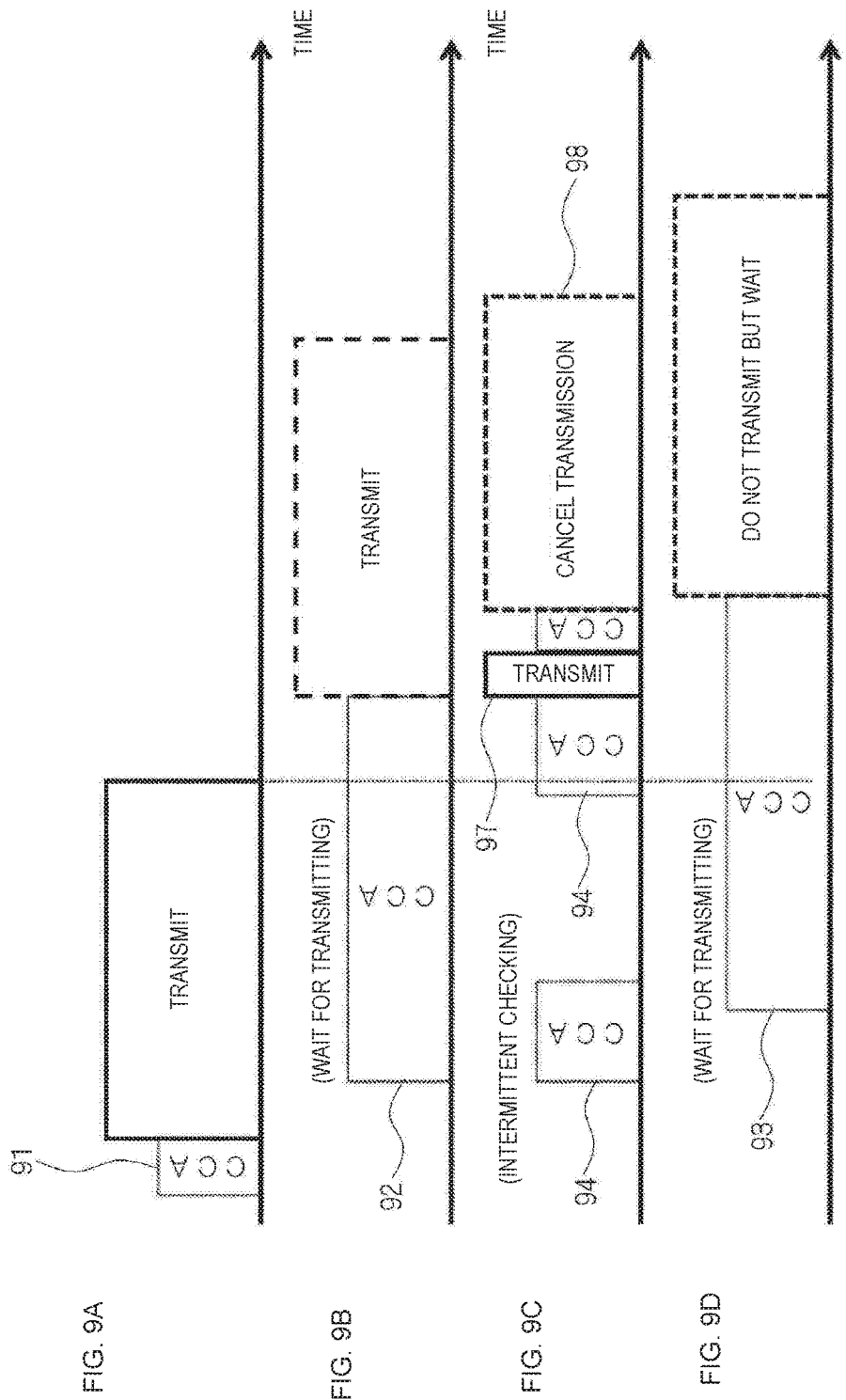
FIGS. 9A-9D illustrate a case in which a collision of communication packets in the same frequency band occurs in the wireless communication device according to the first embodiment of the present disclosure.

A collision of communication packets may occur depending on the timing of the wait time of the wireless LAN terminal 11*b* and that of the wireless communication device 20. FIGS. 9A-9D illustrate a case in which a collision of communication packets in the same frequency band occurs in the wireless communication device 20 according to the first embodiment of the present disclosure. As in FIGS. 8A-8D, FIG. 9(*a*) is a time chart illustrating an example of data transmission in the wireless LAN server 10 shown in FIG. 1. FIG. 9B and FIG. 9D are time charts illustrating examples of data transmission in the wireless LAN terminals 11*b* and 11*c*, respectively, shown in FIG. 1. FIG. 9C is a time chart illustrating an example of data transmission in the wireless communication device (wireless system network terminal) 20 shown in FIG. 1.

In the example shown in FIGS. 9A-9D, the wireless LAN server 10 (FIG. 9A) first performs data transmission after executing CCA 91. During this transmission time, even though, for example, the wireless LAN terminals 11*b* and 11*c* (FIG. 9B and FIG. 9D) execute CCA 92 and CCA 93, respectively, to perform data transmission, they enter the data-transmission wait state since the frequency band is not free. The wireless communication device 20 (FIG. 9C) executes CCA 94 intermittently at regular intervals to transmit data detected by the sensors.

As shown in FIGS. 9A-9D, the wireless LAN terminal 11*c* (FIG. 9D) fails to detect that the frequency band is free upon executing the CCA 93, and thus enters the wait state without necessarily performing data transmission. If the end of the wait time of the wireless LAN terminal 11*b* (FIG. 9B) and that of the wireless communication device 20 (FIG. 9C) coincide with each other when the wireless LAN server 10 (FIG. 9A) has finished data transmission, both of the wireless LAN terminal 11*b* (FIG. 9B) and the wireless communication device 20 (FIG. 9C) try to start data transmission at the same time and thus fail to transmit data.

Unlike the related art, however, even with the occurrence of a failure to transmit data, the amount of data to be subjected to the cancellation of transmission is limited to the preceding data 97 because the data body 98 has not yet been transmitted in the wireless communication device 20 (FIG. 9C). That is, even with the occurrence of a failure to transmit data, a less amount of data results in a waste in data communication than that in the related art so as to reduce power consumed in data communication. This makes it possible to lengthen the battery life even in the wireless communication device 20 including the small power source 26 (see FIG. 2), such as a button cell, as shown in FIG. 9C).

Figure 10:
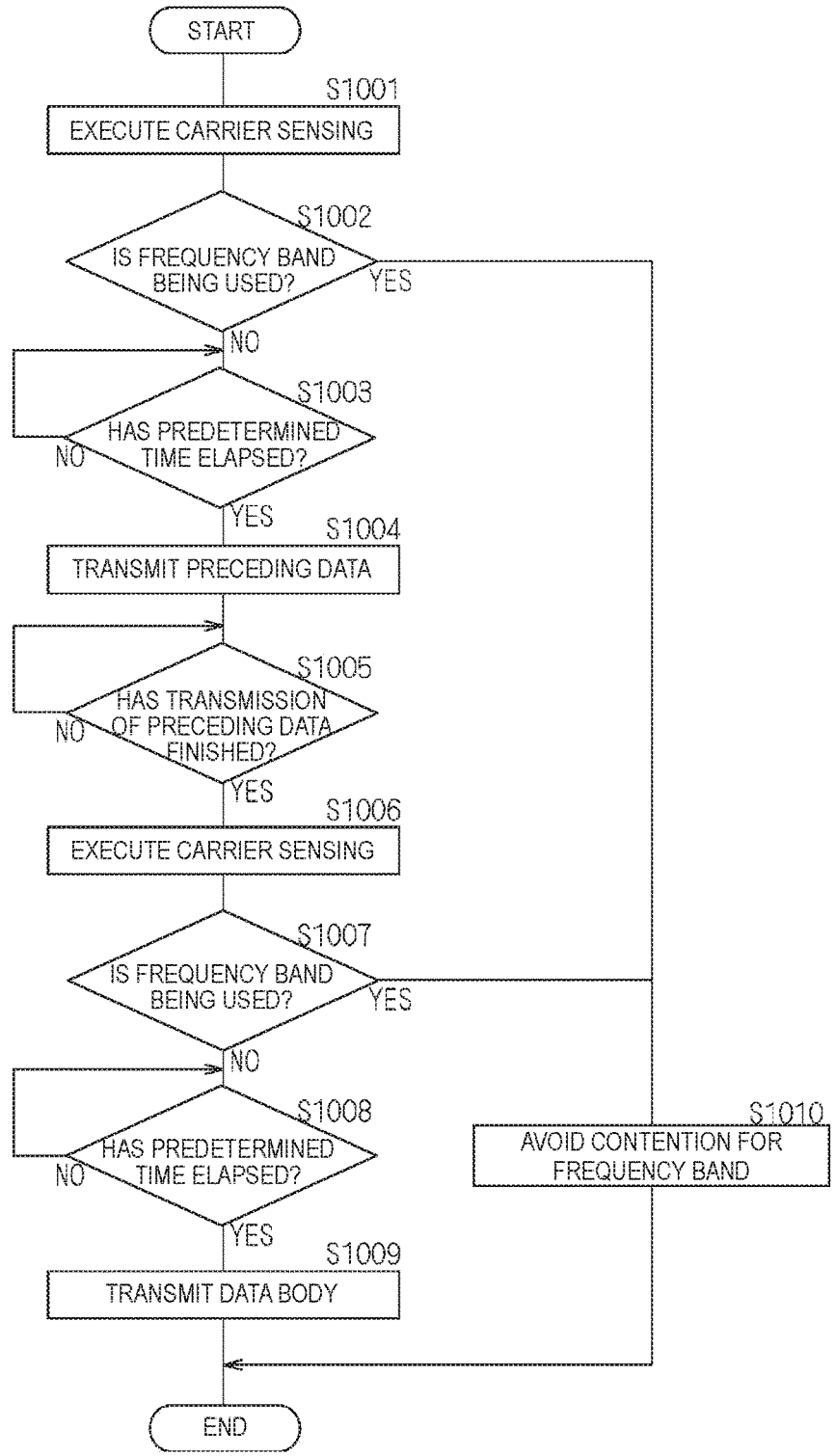
FIG. 10 is a flowchart illustrating processing executed by a microcomputer of the wireless communication device according to the first embodiment of the present disclosure.

FIG. 10 is a flowchart illustrating processing executed by the microcomputer 23 of the wireless communication device 20 according to the first embodiment of the present disclosure. In FIG. 10, the microcomputer 23 of the wireless communication device 20 executes carrier sensing (step S1001) to determine whether the frequency band of radio waves to be transmitted is being used by another contending communication system (step S1002). More specifically, the first collision determining means 601, which includes the carrier sensing executing means 602, determines before starting data transmission whether the frequency band (channel) of radio waves for wireless communication is being used.

If the microcomputer 23 determines that the frequency band of radio waves to be transmitted is not being used by another contending communication system, that is, the frequency band is in the idle state (step S1002: NO), the microcomputer 23 determines whether a predetermined time has elapsed (step S1003). If the microcomputer 23 determines that the predetermined time has not elapsed (step S1003: NO), it enters the data-transmission wait state.

If the microcomputer 23 determines that the predetermined time has elapsed (step S1003: YES), it transmits preceding data (step S1004). The preceding data is the preceding data 52 shown in FIGS. 5A-5C, and may be the header information 54 or the dummy data 56. The preceding data may be generated before carrier sensing is executed or may be divided when data is transmitted.

The microcomputer 23 determines whether the transmission of the preceding data has finished (step S1005). If the microcomputer 23 determines that the transmission of the preceding data has not finished (step S1005: NO), it enters the transmission completion wait state. If the microcomputer 23 determines that the transmission of the preceding data has finished (step S1005: YES), it executes carrier sensing (step S1006) to determine whether the frequency band of radio waves to be transmitted is being used by another contending communication system (step S1007).

If the microcomputer 23 determines that the frequency band of radio waves to be transmitted is not being used by another contending communication system (step S1007: NO), the microcomputer 23 determines whether a predetermined time has elapsed (step S1008). If the microcomputer 23 determines that the predetermined time has not elapsed (step S1008: NO), it enters the data-transmission wait state.

If the microcomputer 23 determines that the predetermined time has elapsed (step S1008: YES), it transmits a data body (step S1009). Then, the transmission of the whole data sequence has been completed.

If the microcomputer 23 determines that the frequency band of radio waves to be transmitted is being used by another contending communication system (step S1002: YES or step S1007: YES), it avoids the contention for the frequency band (step S1010). Specifically, the microcomputer 23 cancels data transmission.

As described above, in the first embodiment, after carrier sensing is executed to check that there is no contention for the frequency band, preceding data having a smaller data amount than a data body is transmitted. Then, after carrier sensing is executed to check that there is no contention for the frequency band, the data body is transmitted. This configuration eliminates the need to transmit the whole data sequence when the contention for the frequency band is occurring, thereby making it possible to reduce the communication load. Even with the occurrence of the contention for the frequency band, only a small amount of data results in a waste in data communication because the subsequent data transmission is canceled, thereby making it possible to reduce the power consumption of a wireless communication apparatus, such as a wireless communication device.

Second Embodiment

The basic configuration of a wireless communication system including a wireless communication device 20 according to a second embodiment of the present disclosure is the same as that of the wireless communication system including the wireless communication device 20 according to the first embodiment of the present disclosure. However, the second embodiment differs from the first embodiment in that the minimum wait time for determining whether the frequency of radio waves to be transmitted is being used by another communication system is set to be shorter than that defined by the protocol of a wireless LAN system.

Figure 11:
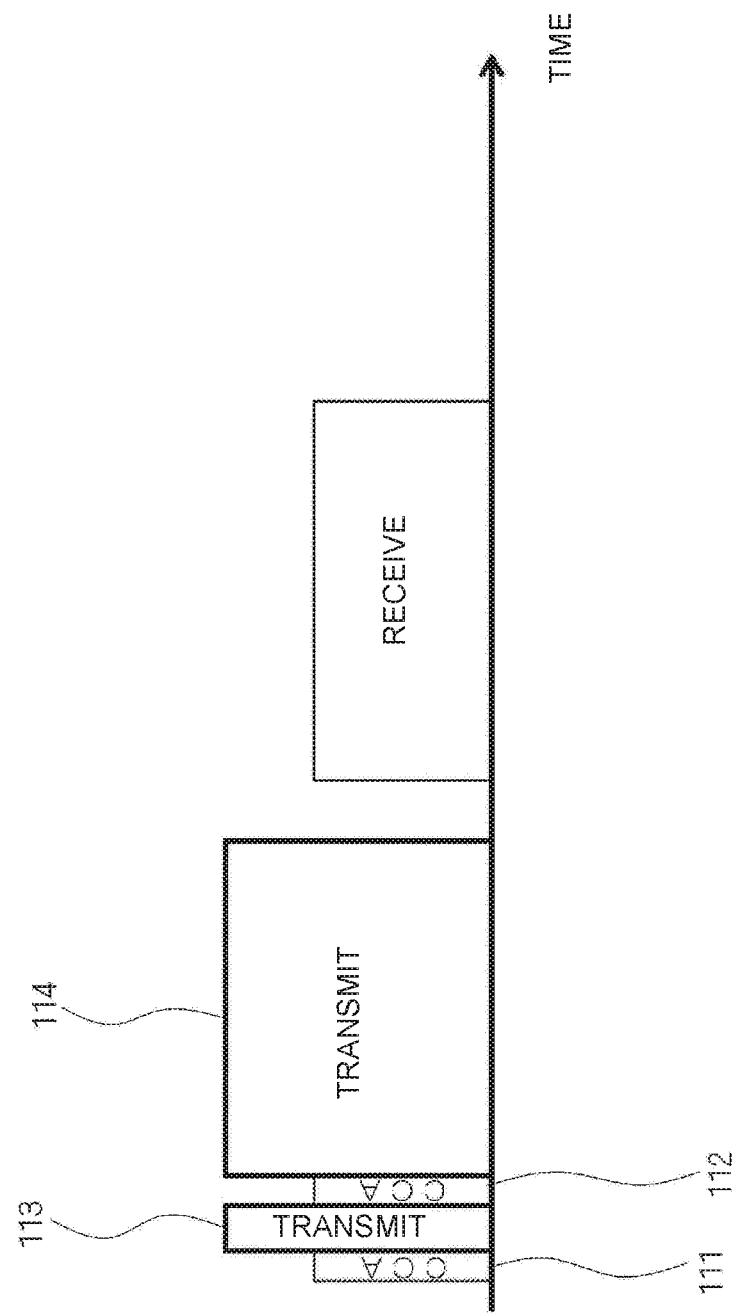
FIG. 11 is a time chart schematically illustrating a data transmit-and-receive operation performed by a wireless communication device according to a second embodiment of the present disclosure.

FIG. 11 is a time chart schematically illustrating a data transmit-and-receive operation performed by the wireless communication device 20 according to the second embodiment of the present disclosure. As shown in FIG. 11, the wireless communication device 20, which uses CSMA/CA, executes CCA (Clear Channel Assessment) (carrier sensing) to check intermittently at regular intervals whether the frequency band (channel) for data transmission is being used by another wireless communication system.

If it is detected that the frequency band for data transmission is not being used by another wireless communication system, that is, the frequency band is free, the wireless communication device 20 performs data transmission by using this frequency band after the lapse of a certain wait time including the execution time of carrier sensing.

In the example shown in FIG. 11, a data sequence is divided into preceding data 113 and a data body 114. The wireless communication device 20 first executes CCA 111 before transmitting the preceding data 113, and upon detecting that the frequency band is free, the wireless communication device 20 transmits the preceding data 113. When the preceding data 113 has been transmitted, the wireless communication device 20 executes CCA 112 again. Upon detecting again that the frequency band is free, the wireless communication device 20 transmits the remaining data body 114.

Upon completion of transmitting of the whole data sequence, if another wireless LAN terminal is executing carrier sensing, a predetermined wait time is generated in addition to the execution time of carrier sensing. After the lapse of the wait time, if the frequency band is free, that is, if data communication is not being performed, the wireless communication device 20 receives data transmitted from another wireless LAN terminal.

In the second embodiment, the minimum wait time for determining whether the frequency band of radio waves to be transmitted is being used by another communication system is set to be shorter than that defined by the protocol of a wireless LAN system, so as to prevent a collision of communication packets, which may occur depending on the timing of the wait time of a wireless LAN terminal and that of the wireless communication device.

FIGS. 12A-12D illustrate the transmission timing of communication packets in the same frequency band in the wireless communication device 20 according to the second embodiment of the present disclosure. As in FIGS. 9A-9D, FIG. 12A is a time chart illustrating an example of data transmission in the wireless LAN server 10 shown in FIG. 1. FIG. 12B and FIG. 12D are time charts illustrating examples of data transmission in the wireless LAN terminals 11b and 11c, respectively, shown in FIG. 1. FIG. 12C is a time chart illustrating an example of data transmission in the wireless communication device (wireless system network terminal) 20 shown in FIG. 1.

Figure 12:
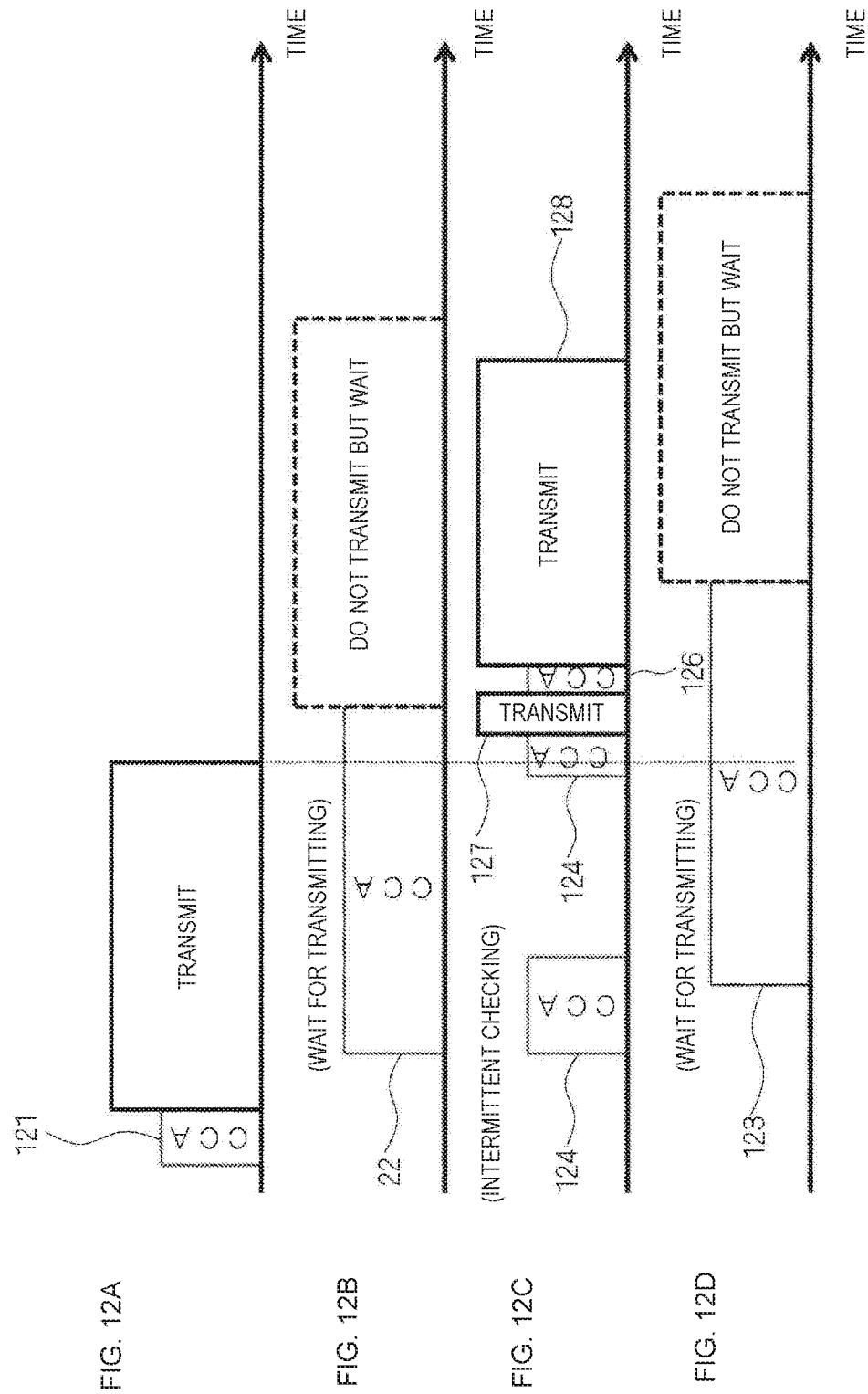
FIGS. 12A-12D illustrate the transmission timing of communication packets in the same frequency band in the wireless communication device according to the second embodiment of the present disclosure.

In the example shown in FIG. 12, the wireless LAN server 10 (FIG. 12A) first performs data transmission after executing CCA 121. During this transmission time, even though, for example, the wireless LAN terminals 11b and 11c (FIG. 12B and FIG. 12D), execute CCA 122 and CCA 123, respectively, to perform data transmission, they enter the data-transmission wait state since the frequency band is not free. The wireless communication device 20 (FIG. 12C) executes CCA 124 intermittently at regular intervals to transmit data detected by the sensors 30.

As shown in FIG. 12, the wireless LAN terminal 11c (FIG. 12D) fails to detect that the frequency band is free upon executing the CCA 123, and thus enters the wait state without necessarily performing data transmission. Upon completion of data transmission by the wireless LAN server 10 (FIG. 12A), the wireless LAN terminal 11b (FIG. 12B) starts to execute CCA until the end of DIFS (Distributed InterFrame Space) duration defined by the protocol of a wireless LAN.

In the second embodiment, the minimum wait time for making a determination by the wireless communication device 20 (FIG. 12C) regarding whether the frequency band of radio waves to be transmitted is being used by another communication system, in other words, the time required for executing carrier sensing, is set to be shorter than the DIFS duration. The wireless communication device 20 (FIG. 12C) executes carrier sensing for a certain period upon the completion of data transmission by the wireless LAN server 10 (FIG. 12A). Consequently, the end of the wait time of the wireless communication device 20 (FIG. 12C) is earlier than that of the wireless LAN terminal 11b (FIG. 12B).

The wireless communication device 20 (FIG. 12C) then transmits preceding data 127. In contrast, the wireless LAN terminal 11b (FIG. 12B) fails to detect that the frequency band is free since the preceding data 127 is being transmitted, and thus enters the wait state without necessarily transmitting data. As a result, a collision of communication packets does not occur, and the need to retransmit data is eliminated.

After finishing transmitting the preceding data 127, the wireless communication device 20 (FIG. 12C) executes CCA 126 again to transmit a data body 128. In this manner, no waste is incurred in data communication and less power is consumed accordingly. This makes it possible to lengthen the battery life even in the wireless communication device 20 including the small power source 26 (see FIG. 2), such as a button cell, as shown in FIG. 12C.

As described above, in the second embodiment, the timing is fixed (defined as described above) so that no waste will be incurred in data communication and less power will be consumed accordingly. This makes it possible to lengthen the battery life even in a wireless communication device such as the wireless communication device 20 (FIG. 12C) including the small power source 26 (see FIG. 2), such as a button cell.

In the second embodiment, the minimum wait time for determining whether the frequency band of radio waves to be transmitted is being used by another communication system is set to be shorter than that defined by the protocol of a wireless LAN system. This minimum wait time can be longer than, for example, SIFS (Short InterFrame Space) duration, which is the shortest frame transmission interval, defined in IEEE 802.11, which is the international standard of a wireless LAN. SIFS is a wait time for receiving an ACK signal returned from a wireless LAN destination which has received data. By setting the above-described minimum wait time to be equal to or longer than SIFS, the contention with a wireless LAN terminal which will successfully finish data transmission can be avoided.

Third Embodiment

The basic configuration of a wireless communication system including a wireless communication device 20 according to a third embodiment of the present disclosure is the same as that of the wireless communication systems including the wireless communication devices 20 according to the first and second embodiments of the present disclosure. However, the third embodiment differs from the first and second embodiments in that a data sequence to be transmitted is divided into two or more partial data sequences.

Figure 13:
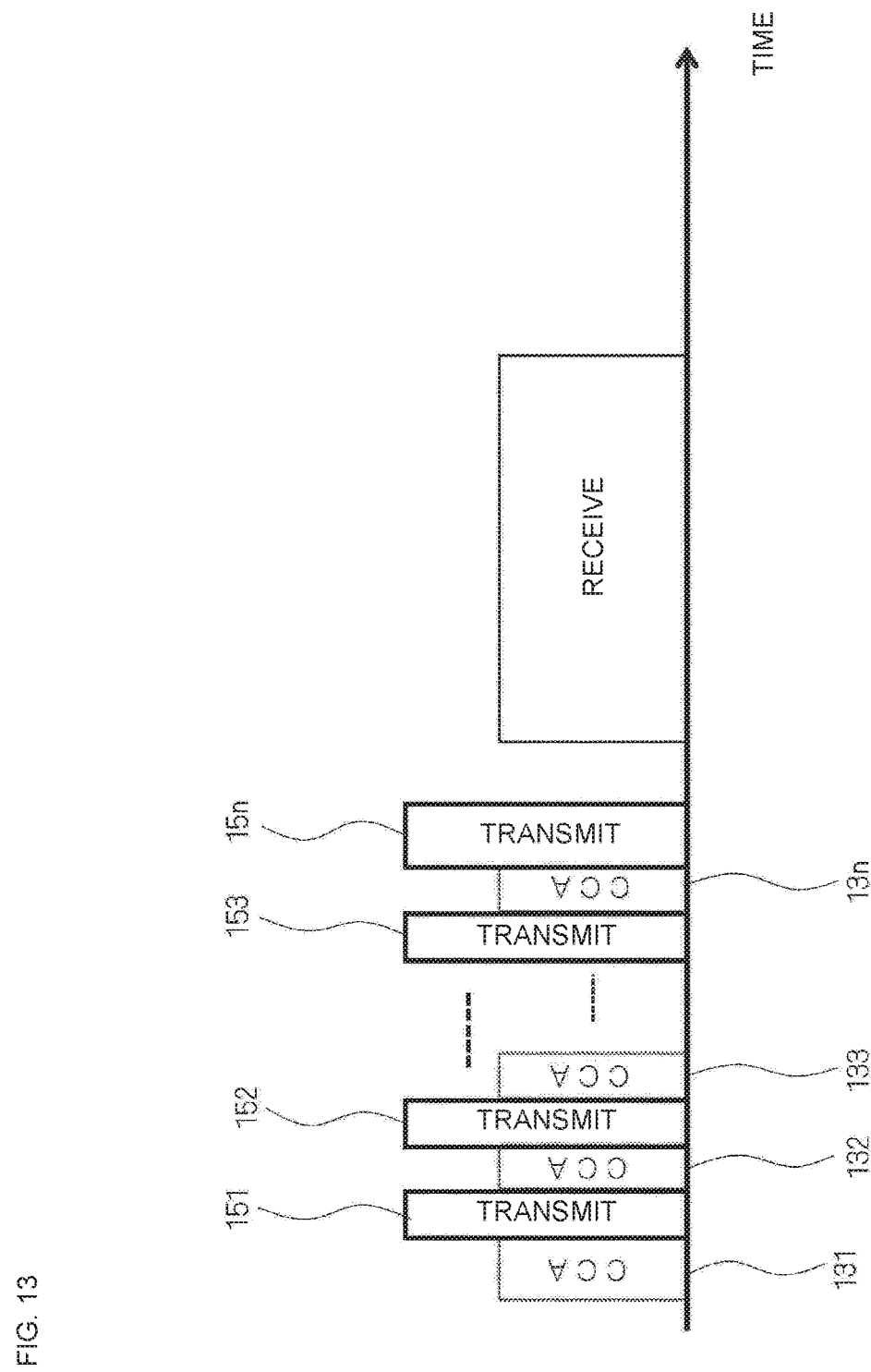
FIG. 13 is a time chart schematically illustrating a data transmit-and-receive operation performed by a wireless communication device according to a third embodiment of the present disclosure.

FIG. 13 is a time chart schematically illustrating a data transmit-and-receive operation performed by the wireless communication device 20 according to the third embodiment of the present disclosure. As shown in FIG. 13, the wireless communication device 20, which uses CSMA/CA, executes CCA (Clear Channel Assessment) (carrier sensing) to check intermittently at regular intervals whether the frequency band (channel) for data transmission is being used by another wireless communication system.

If it is detected that the frequency band for data transmission is not being used by another wireless communication system, that is, the frequency band is free, the wireless communication device 20 performs data transmission by using this frequency band after the lapse of a certain wait time including the execution time of carrier sensing.

In the example shown in FIG. 13, instead of dividing a data sequence into preceding data and a data body, n (n is a natural number) partial data sequences, which are uniformly divided from a data sequence, is generated. The wireless communication device 20 first executes CCA 131 before transmitting a first partial data sequence 151, and upon detecting that the frequency band is free, the wireless communication device 20 transmits the first partial data sequence 151. When the first partial data sequence 151 has been transmitted, the wireless communication device 20 executes CCA 132 again. Upon detecting again that the frequency band is free, the wireless communication device 20 transits a subsequent data sequence 152. Thereafter, the wireless communication device 20 repeats the execution of CCA 133, . . . , 13n and the transmission of partial data sequences 153, . . . , 15n.

Upon completion of transmitting of the whole data sequence, if another wireless LAN terminal is executing carrier sensing, a predetermined wait time is generated in addition to the execution time of carrier sensing. After the lapse of the wait time, if the frequency band is free, that is, if data communication is not being performed, the wireless communication device 20 receives data transmitted from another wireless LAN terminal.

With this configuration, the wireless communication device 20 executes CCA frequently. Consequently, even if a wireless LAN terminal connected to a wireless LAN is interfering with the wireless communication device 20 by performing data transmission, a waste incurred in data communication can be minimized.

FIGS. 14A-14D illustrate the transmission timing of communication packets in the same frequency band in the wireless communication device 20 according to the third embodiment of the present disclosure. As in FIGS. 9A-9D, FIG. 14A is a time chart illustrating an example of data transmission in the wireless LAN server 10 shown in FIG. 1. FIG. 14B is a time chart illustrating an example of data transmission in the wireless LAN terminal 11b shown in FIG. 1. FIG. 14C is a time chart illustrating an example of data transmission in the wireless communication device (wireless system network terminal) 20 shown in FIG. 1.

FIG. 14D is a time chart illustrating an example of data transmission in a wireless LAN terminal, which is a mobile terminal interfering with the wireless communication device 20 by transmitting data using a wireless LAN. In the example shown in FIGS. 14A-14D, the wireless LAN server 10 (FIG. 14A) first performs data transmission after executing CCA 141. During this transmission time, even though, for example, the wireless LAN terminal 11b (FIG. 14B) executes CCA 142 to perform data transmission, it enters the data-transmission wait state since the frequency band is not free. The wireless communication device 20 (FIG. 14C) executes CCA 144 intermittently at regular intervals to transmit data detected by the sensors 30.

The wireless communication device 20 has divided a data sequence to be transmitted into n partial data sequences. The wireless communication device 20 thus executes carrier sensing (CCA 144 through CCA 14n) before transmitting the divided partial data sequences 151 through 15n. In the example shown in FIGS. 14A-14D, the wireless LAN terminal 11b (FIG. 14B) fails to detect that the frequency band is free (for a predetermined period or longer) upon executing the CCA 142, and thus enters the wait state without necessarily performing data transmission.

The wireless communication device 20 transmits the partial data sequences 151 and 152 after executing CCA 145 and CCA 146, respectively. If, during the transmission of the partial data sequence 152, the wireless LAN terminal (FIG. 14D) is interfering with the wireless communication device 20 by transmitting data 160, the wireless communication device 20 fails to detect as a result of executing CCA 147 that the frequency band is free. Consequently, the transmission of the subsequent partial data sequences 153, . . . , 15n is canceled.

In this manner, if the wireless LAN terminal (FIG. 14D) is interfering with the wireless communication device 20, the transmission of the subsequent partial data sequences is canceled after CCA is executed. However, the data sequence has been divided into partial data sequences, and the transmission of only certain partial data sequences is canceled, thereby minimizing a waste incurred in data communication. This makes it possible to decrease power consumed in data communication and to lengthen the battery life even in the wireless communication device 20 including the small power source 26 (see FIG. 2), such as a button cell, as shown in FIG. 14C.

As described above, in the third embodiment, a data sequence to be transmitted is divided into two or more partial data sequences, which allows more precise checking for the occurrence of the contention for the frequency band. It is thus possible to eliminate the need to transmit the whole data sequence when the contention for the frequency band is occurring and thus to reduce the communication load.

The above-described embodiments can be modified or changed without departing from the spirit of the present disclosure.

REFERENCE SIGNS LIST 10 wireless LAN server (WLAN AP)
11a to 11e wireless LAN terminal (WLAN terminal)
12a, 12b, 20 wireless system network terminal (wireless communication device)
23 microcomputer
26 power source (battery)

The invention claimed is:

1. A wireless communication device comprising a processor, a memory, a power source, and a sensor interface, the wireless communication device controlling a contention state of a plurality of communication systems by using a carrier sensing technique, the wireless communication device configured to:
   divide a data sequence to be transmitted into preceding data and a data body, wherein the preceding data is the header information of the data sequence to be transmitted and an amount of the header information is smaller than an amount of the data body;
   determine, by executing first carrier sensing, whether a frequency band of radio waves to be transmitted is being used by another contending communication system;
   transmit only the preceding data after a lapse of a first predetermined time after the first carrier sensing if determined that the frequency band is not being used;
   determine, by executing second carrier sensing after completion of transmitting of the preceding data, whether the frequency band is being used by another contending communication system;
   transmit the data body after a lapse of a second predetermined time after the second carrier sensing if determined that the frequency band is not being used; and
   avoid a contention for the frequency band if it is determined that the frequency band is being used.

2. The wireless communication device according to claim 1, wherein the header information comprises information concerning a data content and a modulation method.

3. The wireless communication device according to claim 2, wherein the wireless communication device is configured to divide the data sequence to be transmitted into two or more partial data sequences.

4. The wireless communication device according to claim 1, wherein the preceding data is a portion of the data sequence, and the data body is a remaining portion of the data sequence.

5. The wireless communication device according to claim 1, wherein the preceding data includes identification information for identifying a transmission source and/or a transmission destination.

6. The wireless communication device according to claim 1, wherein the other contending communication system is a wireless LAN system.

7. The wireless communication device according to claim 6, wherein a minimum wait time used for making a determination regarding whether the frequency band of radio waves to be transmitted is being used by the other contending communication system is shorter than a minimum wait time defined by a protocol of the wireless LAN system.

8. The wireless communication device according to claim 1, wherein the data sequence is a data sequence received from a sensor at regular time intervals.

9. A wireless communication device comprising a processor, a memory, a power source, and a sensor interface, the wireless communication device controlling a contention state of a plurality of communication systems by using a carrier sensing technique, the wireless communication device configured to:
   divide a data sequence to be transmitted into preceding data and a data body, wherein the preceding data is dummy data, which is independent of the data sequence to be transmitted, and an amount of the dummy data is smaller than an amount of the data body;
   determine, by executing first carrier sensing, whether a frequency band of radio waves to be transmitted is being used by another contending communication system;
   transmit only the preceding data after a lapse of a first predetermined time after the first carrier sensing if determined that the frequency band is not being used;
   determine, by executing second carrier sensing after completion of transmitting of the preceding data, whether the frequency band is being used by another contending communication system;
   transmit the data body after a lapse of a second predetermined time after the second carrier sensing if determined that the frequency band is not being used; and
   avoid a contention for the frequency band if it is determined that the frequency band is being used.

10. A wireless communication method to be performed by a wireless communication device comprising a processor, a memory, a power source, and a sensor interface, the wireless communication device controlling a contention state of a plurality of communication systems by using a carrier sensing technique, the wireless communication method comprising:
   a first step of dividing a data sequence to be transmitted into preceding data and a data body, wherein the preceding data is the header information of the data sequence to be transmitted and an amount of the header information is smaller than an amount of the data body;
   a second step of determining, by the wireless communication device, by executing first carrier sensing whether a frequency band of radio waves to be transmitted is being used by another contending communication system;
   a third step of transmitting, by the wireless communication device, only the preceding data after a lapse of a first predetermined time after the first carrier sensing if the first step determines that the frequency band is not being used;

a fourth step of determining, by the wireless communication device, by executing second carrier sensing after completion of transmitting of the preceding data, whether the frequency band is being used by another contending communication system;

a fifth step of transmitting, by the wireless communication device, the data body after a lapse of a second predetermined time after the second carrier sensing if the third step determines that the frequency band is not being used; and a sixth step of avoiding, by the wireless communication device, a contention for the frequency band if the first step and/or the third step determines that the frequency band is being used.

11. The wireless communication method according to claim 10, wherein the header information comprises information concerning a data content and a modulation method.

12. The wireless communication method according to claim 10, further comprising:

wherein the first step divides the data sequence to be transmitted into two or more partial data sequences.

13. The wireless communication method according to claim 10, wherein the preceding data is a portion of the data sequence, and the data body is a remaining portion of the data sequence.

14. The wireless communication method according to claim 10, wherein the preceding data includes identification information for identifying a transmission source and/or a transmission destination.

15. The wireless communication method according to claim 10, wherein the other contending communication system is a wireless LAN system.

16. The wireless communication method according to claim 15, wherein a minimum wait time used for making a determination by the first and third steps regarding whether the frequency band of radio waves to be transmitted is being used by the other contending communication system is shorter than a minimum wait time defined by a protocol of the wireless LAN system.

17. The wireless communication method according to claim 10, wherein the data sequence is a data sequence received from a sensor at regular time intervals.

* * * * *